United States Patent
Kano et al.

(10) Patent No.: US 7,220,307 B2
(45) Date of Patent: *May 22, 2007

(54) TREATED PIGMENT, USE THEREOF, AND COMPOUND FOR PIGMENT TREATMENT

(75) Inventors: Masanori Kano, Osaka (JP); Kazunori Itoh, Osaka (JP); Takaaki Yodo, Osaka (JP); Naoyuki Kitaoka, Osaka (JP); Hideo Shibata, Osaka (JP)

(73) Assignee: Sakata Inx Corp., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/519,079

(22) PCT Filed: Jun. 25, 2003

(86) PCT No.: PCT/JP03/08019

§ 371 (c)(1),
(2), (4) Date: Jul. 8, 2005

(87) PCT Pub. No.: WO04/000950

PCT Pub. Date: Dec. 31, 2003

(65) Prior Publication Data

US 2005/0256247 A1    Nov. 17, 2005

(30) Foreign Application Priority Data

Jun. 25, 2002 (JP) .............................. 2002-185172

(51) Int. Cl.
| | |
|---|---|
| C09C 3/10 | (2006.01) |
| C09C 1/48 | (2006.01) |
| C09B 67/00 | (2006.01) |
| C09B 67/20 | (2006.01) |
| C08K 5/29 | (2006.01) |
| C07C 249/02 | (2006.01) |
| G03C 1/00 | (2006.01) |
| G03F 7/004 | (2006.01) |
| G02B 5/20 | (2006.01) |
| G02B 5/00 | (2006.01) |

(52) U.S. Cl. .................... 106/476; 106/493; 106/499; 524/495; 564/252

(58) Field of Classification Search ................ 106/476, 106/493, 499; 524/495; 562/252
See application file for complete search history.

(56) References Cited

U.S. PATENT DOCUMENTS

| 5,371,148 | A | * | 12/1994 | Taylor et al. ................ 525/293 |
|---|---|---|---|---|
| 5,439,982 | A | * | 8/1995 | Taylor et al. ................ 525/293 |
| 5,602,264 | A | * | 2/1997 | Rapoport et al. ............ 549/448 |
| 6,730,807 | B1 | * | 5/2004 | Haberle et al. ............. 562/439 |
| 7,049,001 | B2 | * | 5/2006 | Haberle et al. .......... 428/423.1 |
| 2003/0064208 | A1 | | 4/2003 | Yamada et al. |
| 2003/0088030 | A1 | * | 5/2003 | Haberle et al. .......... 525/326.6 |
| 2005/0118424 | A1 | * | 6/2005 | Takahashi et al. .......... 428/402 |
| 2006/0094851 | A1 | * | 5/2006 | Audenaert et al. ............ 528/44 |

FOREIGN PATENT DOCUMENTS

| JP | 54-37082 | 3/1979 |
|---|---|---|
| JP | 7-207012 | 8/1995 |
| JP | 9-166869 | 6/1997 |
| JP | 9-169821 | 6/1997 |
| JP | 2002-69329 | 3/2002 |
| JP | 2002-97390 | 4/2002 |
| JP | 2002-201381 | 7/2002 |
| WO | WO 03/076527 A1 | 12/2004 |

* cited by examiner

*Primary Examiner*—Anthony J. Green
(74) *Attorney, Agent, or Firm*—Westerman, Hattori, Daniels & Adrian, LLP.

(57) ABSTRACT

A treated pigment and a dispersion composition thereof having preferable dispersion stability and fluidity in a dispersion medium even the pigment has no functional group reactive with a carbodiimide group on the surface thereof, and further to provide a resist composition exerting very excellent developing characteristics when forming color filters, black matrices and the like patterns. Furthermore, the invention also provides a compound for pigment treatment suited for the treatment of such pigment. A treated pigment which is producible by the treatment with a carbodiimide-based compound having at least one side chain selected from the group consisting of polyester side chains, polyether side chains and polyacrylic side chains and at least one basic nitrogen-containing group within the molecule.

10 Claims, No Drawings

TREATED PIGMENT, USE THEREOF, AND COMPOUND FOR PIGMENT TREATMENT

TECHNICAL FIELD

The present invention relates to a treated pigment and a use thereof and, more particularly, to a treated pigment intended for use not only in ordinary printing inks and paints but also in colorant compositions required to show good fluidity and dispersion stability in a finely dispersed state at high concentrations and, in relation to a use thereof, to a pigment dispersion-based resist composition enabling the manufacture of color filters having good contrast and high transmissivity characteristics and black matrices having excellent shielding and high insulating characteristics. The invention also relates to a compound for pigment treatment suited for treating an organic pigment or carbon black, and particularly one having an adsorption part with a basic nitrogen-containing group on the surface thereof.

BACKGROUND ART

It is a current tendency to utilize pigments as colorants not only in various printing inks and paints but also in those fields in which clearer colorations are required, for example in color filters and inks for ink jet printing.

In recent years, marked advances have been made in the technology of dispersing such pigments. The method which is used for further rationalization of production processes comprises carrying out dispersion so as to increase the pigment concentration as far as possible. However, there is a fundamental problem that as the pigment concentration increases, the fluidity and dispersion stability decrease.

In addition, in the fields of color filters and ink jet recording, where high levels of fastness are required, it is necessary to use high-grade pigments and reduce the particle diameter to a finer level so that clearer colorations may be accomplished. However, high-grade pigments are by nature poor in dispersion stability as compared with other pigments and, further, as the particle diameter becomes finer, the tendency toward aggregation increases and it becomes difficult to obtain stable dispersions.

On the other hand, carbon black is widely used as a pigment showing a high level of blackness. However, it has problems, namely difficulty in attaining high concentrations thereof and insufficiency in dispersion stability due to its characteristics that its primary particle diameter is very small and it is porous and has a large specific surface area. Recently, attempts have been made to use carbon black also as a light-shielding material for black matrices. It is a problem, however, that it is difficult to obtain highly insulating black matrices from carbon black which is highly conductive.

Therefore, for solving such problems, investigations have so far been made concerning, for example, the treatment (surface treatment/modification) of pigments themselves or the development of pigment dispersants, pigment derivatives or surfactants, each having marked ability to wet (adsorption ability) pigments and/or be wetted to increase the pigment dispersion stability and/or pigment concentration, and a number of research works are now still going on.

For example, Japanese Kokai Publication Sho-54-37082 discloses a dispersant which comprises a reaction product derived from poly(lower alkylene)imine and a free carboxyl group-containing polyester in which at least two polyester chains are bonded to each poly(lower alkylene)imine chain; Japanese Kokai Publication Hei-07-207012 discloses a pigment dispersant produced by reacting a carboxyl group-terminated polylactone compound obtained by the ring-polymerization of a lactone compound using hydroxycarboxylic acid as an initiator with a polyalkylene polyamine compound; Japanese Kokai Publication Hei-09-169821 discloses a polyallylamine derivative introduced with a polyester, polyamide, etc. into an amino group of the polyallylamine; and further Japanese Kokai Publication Hei-09-166869 discloses a grafting method which comprises reacting a dispersant having a functional group such as an aziridine group, isocyanate group and epoxy group with a carboxyl group in carbon black having a functional group such as a carboxyl group, however, even with this method, improvements in fluidity and dispersion stability at high concentrations have not been achieved.

Thus, the applicant paid attention to a carbodiimide group having high reactivity particularly with a carboxyl group as a technology of improving the dispersibility by grafting a pigment such as carbon black, and has already developed and proposed a treated pigment capable of stably maintaining a finely dispersed state by grafting a dispersant containing the carbodiimide group within the molecule onto the surface of the above pigment (Japanese Kokai Publication 2002-201381). Furthermore, the applicant has found that the dispersion stability and fluidity of a treated pigment can be further improved by introducing a specific side chain into the molecule of a carbodiimide compound (Japanese Patent Applications No. 2002-064416, No. 2002-74966, No. 2002-89231, and No. 2002-186838).

Such a treated pigment as proposed by the applicant is utilized in printing inks, paints, ink jet recording liquids and the like and, in addition, suitably utilized particularly in resist compositions for said color filters and black matrices.

Furthermore, in recent years, dealing with high concentration of pigments which has been required, dispersing stability and fluidity become exceedingly preferable even in the case of highly-concentrated pigments, clear and high contrast coatings can be obtained in organic pigments, coatings having high insulating property and light-shielding property can be obtained in carbon black, further developing ability is improved when used as a resist composition; and other excellent effects are to be obtained.

However, the above-mentioned technology is highly effective for pigments having a functional group reactive with a carbodiimide group on the surfaces, but there has been a problem that the effect is hardly obtained for those pigments having no such functional group. Further, when the pigment is used as a resist composition, higher developability is sometimes required, and there has been room for further improvements.

SUMMARY OF THE INVENTION

It is an object of the present invention to provide a treated pigment and a dispersion composition thereof having preferable dispersion stability and fluidity in a dispersion medium even the pigment has no functional group reactive with a carbodiimide group on the surface thereof, and further to provide a resist composition exerting very excellent developing characteristics when forming color filters, black matrices and the like patterns. Furthermore, the invention is also to provide a compound for pigment treatment suited for the treatment of such pigment.

The present inventors have made intensive investigations for solving the above-mentioned objects, and as a result, they found that all the above objects can be solved by treating a pigment having an adsorption part with a basic nitrogen-containing group and further preferably a functional group reactive with a carbodiimide group with a carbodiimide-based compound having at least one side chain selected from the group consisting of polyester side chains, polyether side chains and polyacrylic side chains and a basic nitrogen-containing group. Based on such and other findings, the present invention has been completed.

That is, the present invention relates to (1) a treated pigment which is producible by the treatment of a pigment with a carbodiimide-based compound having at least one side chain selected from the group consisting of polyester side chains, polyether side chains and polyacrylic side chains and at least one basic nitrogen-containing group within the molecule.

Further, the invention relates to (2) the treated pigment according to the above (1), wherein said carbodiimide-based compound contains 0.02 to 4 mmol of a basic nitrogen-containing group per 1 g of said compound.

Further, the invention relates to (3) the treated pigment according to the above (1) or (2), wherein said pigment has an adsorption part with a basic nitrogen-containing group.

Further, the invention relates to (4) the treated pigment according to any one of the above (1) to (3), wherein said pigment has a functional group reactive with a carbodiimide group, and said carbodiimide-based compound further contains at least one carbodiimide group within the molecule.

Further, the invention relates to (5) the treated pigment according to the above (4), wherein said pigment having a functional group reactive with a carbodiimide group is an organic pigment or carbon black having a functional group reactive with a carbodiimide group, said functional group reactive with a carbodiimide group having at least one functional group selected from the group consisting of a carboxyl group, sulfonic acid group, hydroxyl group and amino group.

Further, the invention relates to (6) the treated pigment according to any one of the above (1) to (5), wherein said carbodiimide-based compound has a basic nitrogen-containing group in the main chain.

Further, the invention relates to (7) the treated pigment according to any one of the above (1) to (6), wherein said basic nitrogen-containing group is a tertiary amino group or a nitrogen-containing heterocyclic group.

Further, the invention relates to (8) a pigment dispersion composition which comprises the treated pigment according to any one of the above (1) to (7) and a dispersion medium.

Further, the invention relates to (9) a compound for pigment treatment which is a carbodiimide-based compound having at least one side chain selected from the group consisting of polyester chains, polyether chains and polyacrylic chains, and at least one basic nitrogen-containing group within the molecule.

Further, the invention relates to

(10) the compound for pigment treatment according to the above (9), which is a carbodiimide-based compound further comprising at least one carbodiimide group within the molecule.

DETAILED DESCRIPTION OF THE INVENTION

In the following, the treated pigment, the use thereof, and the compound for pigment treatment of the invention are described in detail.

The treated pigment of the present invention is producible by the treatment of an organic pigment or carbon black having an adsorption part with a basic nitrogen-containing group on the surfaces thereof with a carbodiimide-based compound having at least one side chain selected from the group consisting of polyester side chains, polyether side chains and polyacrylic side chains and a basic nitrogen-containing group. The treated pigment of the invention may be in the form of a pigment dispersion obtained by using a dispersion medium or the like, or in the form of a dry matter obtained without using any dispersion medium.

Further, when this treated pigment is dispersed in a dispersion medium and when the carbodiimide-based compound is one having at least one side chain selected from the group consisting of those polyester side chains, polyether side chains and polyacrylic side chains which are to be mentioned later herein, said side chain forms a domain in the dispersion medium and shows a steric hindrance effect, etc., hence it appears that the pigment can thereby be more stably dispersed in the dispersion medium as compared with the case of general acid-base adsorption alone.

In cases where the pigment is carbon black, there presumably arises a state such that the carbon black surface is covered with such an insulating material as the carbodiimide compound, hence a pigment dispersion-based resist composition for black matrices which contains such a treated carbon black species can acquire very excellent high-level insulating properties.

First, the pigment used in the practice of the invention is described.

The pigments to be used in the practice of the invention include organic pigments and carbon black which are in general use for printing inks, resist composition for color filters, etc. As the species of the organic pigments, there may be mentioned, for example, dye chelate pigments, azo pigments, benzimidazolone pigments, phthalocyanine pigments, quinacridone pigments, anthraquinone pigments, dioxazine pigments, indigo pigments, thioindigo pigments, perylene pigments, perinone pigments, diketopyrrolopyrrole pigments, isoindolinone pigments, nitro pigments, nitroso pigments, anthraquinone pigments, flavanthrone pigments, quinophthalone pigments, pyranthrone pigments, indanthrone pigments, and like organic pigments.

Usable as the carbon black are preferably those carboxyl group-containing species showing a pH of 7.0 or below. More specifically, one or more of the carbon black species given below by way of example can be used.

Firstly, usable as the carbon black produced by Mitsubishi Chemical Corporation are carbon black #2700, #2650, #2600, #2400, #2350, #2200, #1000, #990, #970, MA600, MA77, MA7, MA8, MA11, MA100, MA220, and the like.

Additionally, usable as the carbon black produced by Cabot are MONARCH1400, MONARCH1300, MONARCH1100, MONARCH1000, MOGUL-L, REGAL400R, REGAL350R, and the like.

Further, usable as the carbon black produced by Degussa are ColorBlack Fw200, ColorBlack Fw2, ColorBlack Fw2V, ColorBlack Fw1, ColorBlack Fw18, ColorBlack S170, ColorBlack S160, SpecialBlack6, SpecialBlack5, SpecialBlack4, SpecialBlack4A, SpecialBlack550, Special- Black350, SpecialBlack250, SpecialBlack100, Printex150T, PrintexU, PrintexV, Printex140U, Printex140V, and the like. These are all product names.

The above-mentioned pigments preferably have an adsorption part with a basic nitrogen-containing group. Said adsorption part with a basic nitrogen-containing group is typically an acid group, and preferably a functional group reactive with a basic nitrogen-containing group such as a carboxyl group and sulfonic acid group. In addition, even those pigments having no adsorption part with a basic nitrogen-containing group in the untreated state can be used by treating with a general functional group-introduction method such as derivative treatment and sulfonation treatment of the pigment surface as a method of introducing a carboxyl group and sulfonic acid group.

When the below-mentioned carbodiimide-based compounds have a carbodiimide group, the above pigments preferably have further a functional group reactive with a carbodiimide group. Herein, the functional group reactive with a carbodiimide group preferably has at least one functional group selected from the group consisting of a carboxyl group, sulfonic acid group, hydroxyl group and amino group. In such cases, even pigments having no functional group reactive with a carbodiimide group can be introduced with a functional group by surface treatment. In addition to the above derivative treatment and sulfonation treatment, the above functional group reactive with a carbodiimide group can be introduced, for example, by the plasma treatment or oxygen/ultraviolet treatment described in "Ganryo Bunsan Anteika to Hyomen Shori Gijyutsu: Hyoka (Pigment Dispersion Stabilization and Surface Treatment Techniques: Evaluations)", 1st printing, published by Technical Information Institute on Dec. 25, 2001, pages 76–85, or by the low-temperature plasma method described in Japanese Kokai Publication Sho-58-217559.

Next, the carbodiimide-based compounds to be used for treating pigments in the practice of the invention are described.

The carbodiimide-based compounds which can be used in the invention is a carbodiimide-based compound having at least one side chain selected from the group consisting of a polyester side chain, polyether side chain and polyacrylic side chain and at least one basic nitrogen-containing group within the molecule.

In this specification, "the carbodiimide-based compound" refers to a compound obtainable by the introduction of the above side chain and basic nitrogen-containing group using a carbodiimide group-containing compound as a basis, and includes, needless to say, ones containing a carbodiimide group, and also includes ones containing no carbodiimide group within the molecule of the compound finally obtained.

The term "side chain" as used herein means a chain branching off from the main chain, which is the carbodiimide-based compound proper. When at least one polyester chain and at least one polyether chain are combined in one side chain, the side chain thus formed belongs to both categories of "polyester side chain" and "polyether side chain". When at least one polyester chain and at least one polyacrylic chain are combined in one side chain, the side chain thus formed belongs to both categories of "polyester side chain" and "polyacrylic side chain" and, when at least one polyether chain and at least one polyacrylic chain are combined in one side chain, the side chain thus formed belongs to both categories of "polyether side chain" and "polyacrylic side chain". Further, when at least one polyester chain, at least one polyether chain and at least one polyacrylic chain are combined, the side chain thus formed belongs to all the categories of "polyester side chain", "polyether side chain" and "polyacrylic side chain". Such side chains in which a polyester chain and/or a polyether chain and/or a polyacrylic chain occur in admixture each of course is a side chain satisfying the requirement "having at least one side chain selected from the group consisting of polyester side chains, polyether side chains and polyacrylic side chains". In addition, "the basic nitrogen-containing group" includes a nitrogen-containing group forming a quaternary ammonium ion in water, as well as a nitrogen-containing group acting as a Lewis base, i.e. typical ones thereof include an amino group, nitrogen-containing heterocyclic group, etc.

Most preferably, compounds resulting from intramolecular introduction of at least one side chain selected from the group consisting of polyester chains, polyether chains and polyacrylic chains by utilizing the reaction of the carbodiimide group with a functional group reactive therewith can be utilized as the carbodiimide-based compound. In the present specification, such reaction between a carbodiimide group and a functional group is sometimes referred to as "grafting reaction", and the thus-introduced side chain as "grafted side chain". The polyester side chain thus introduced is sometimes referred to as "grafted polyester side chain", the polyether side chain thus introduced as "grafted polyether side chain", and the polyacrylic side chain thus introduced as "grafted polyacrylic side chain".

As the carbodiimide-based compound having such a grafted side chain(s) as mentioned above, there may first be mentioned compounds derived from compounds having one or more carbodiimide groups in each molecule by addition of at least one side chain selected from the group consisting of polyester side chains, polyether side chains and polyacrylic side chains by the grafting reaction.

Utilizable as the compound having one or more carbodiimide groups in each molecule are, for example, compounds obtained by subjecting a diisocyanate compound to decarboxylation for carbodiimide group formation in an organic solvent in the presence of a carbodiimide formation catalyst. As specific examples of the diisocyanate compound to be subjected to decarboxylation, there may be mentioned such aliphatic, alicyclic, aromatic or aralphatic diisocyanate compounds as hexamethylene diisocyanate, isophoronediisocyanate, tolylene diisocyanate, diphenylmethanediisocyanate, cyclohexanediisocyanate, dicyclohexylmethanediisocyanate, xylylene diisocyanate, tetramethylene diisocyanate, and tetramethylxylylene diisocyanate.

The organic solvent which is utilizable is one having a high boiling point and having no active hydrogen atom reactive with the isocyanate compound or the carbodiimide group-containing compound formed. Specifically, there may be mentioned aromatic hydrocarbons such as toluene, xylene and diethylbenzene; glycol ether esters such as diethylene glycol diacetate, dipropylene glycol dibutyrate, hexylene glycol diacetate, glycol diacetate, methylglycol acetate, ethylglycol acetate, butylglycol acetate, ethyldiglycol acetate and butyldiglycol acetate; ketones such as ethyl butyl ketone, acetophenone, propiophenone, diisobutyl ketone and cyclohexanone; and aliphatic esters such as amyl acetate, propyl propionate and ethyl butyrate; and the like.

Utilizable as the carbodiimide formation catalyst are phospholenes, phospholene oxides and so forth. As specific examples, there may be mentioned 1-ethyl-3-methyl-3-phospholene oxide, 1-phenyl-3-methyl-3-phospholene oxide, 1-phenyl-3-methyl-2-phospholene oxide, and the like.

In carrying out the isocyanate group-involving decarboxylation reaction using these materials, use may be made of any of the methods known in the art. Thus, for example, the reaction can be carried out in a nitrogen atmosphere at a reaction temperature of 100 to 200° C. As other methods for obtaining the carbodiimide group-containing compounds mentioned above, there may be mentioned the methods described in U.S. Pat. No. 2,941,956, Japanese Patent Publication Sho-47-33279, Japanese Kokai Publication Hei-05-178954 and Japanese Kokai Publication Hei-06-56950, and the like.

Those compounds obtained by using such a method, for example by decarboxylation of K (≧2) moles of a diisocyanate compound, can be represented by the general formula (1) given below.

OCN-(A-N=C=N)$_{K-1}$-A-NCO  (1)

In the above general formula, A is the residue derived from the diisocyanate compound used for the synthesis of the carbodiimide compounds by removal of the isocyanate groups.

As commercial grades of the carbodiimide group-containing compounds represented by the above general formula (1), there may be mentioned Carbodilite V-03, V-05, etc. (all being product names, manufactured by Nisshinbo Industries, Inc.), which are carbodiimides derived from tetramethylxylylene diisocyanate as a starting material.

The compound represented by the above general formula (1) has an isocyanate group within the molecule. In synthesizing the carbodiimide-based compound to be used in the invention, in some cases, preferably, the compound is subjected to a reaction so as to eliminate the isocyanate group in advance, and then reacted with a carbodiimide group. Particularly in the cases where the component forming a side chain by the grafting mentioned below has a functional group reactive with an isocyanate group in addition to the functional group reactive with a carbodiimide group, or where said component has a functional group having a reactivity with an isocyanate group being equivalent or more as compared with that with a carbodiimide group, the isocyanate group is preferably eliminated.

In such case, it is also possible to use the compound as a compound having one or more carbodiimide groups within the molecule which is to be used as a basis for forming the carbodiimide-based compound of the invention by reacting the isocyanate group with a compound selectively reacting with the isocyanate group firstly due to low reactivity with residual carbodiimide groups.

The carbodiimide-based compound which is the compound for pigment treatment of the invention has a basic nitrogen-containing group within the molecule. As the method for obtaining such carbodiimide-based compound, one can be mentioned as a preferable example which comprises introducing a basic nitrogen-containing group into a carbodiimide group-containing compound using the reaction with an isocyanate group mentioned above. In introducing a basic nitrogen-containing group into a carbodiimide group-containing compound, from the above-mentioned conditions, it is preferable to use a compound containing a hydroxyl group suitable as a functional group selectively-reactive with an isocyanate group and a tertiary amino group or basic nitrogen-containing heterocyclic group which are not involved with the reactions with a carbodiimide group and isocyanate group.

Specifically, as the compound containing one hydroxyl group and a tertiary amino group, there may be mentioned, for example, N,N-dialkylalkanolamine compounds such as N,N-dimethylethanolamine and N,N-diethylethanolamine, an ethylene oxide adduct of a secondary amine compound, a reaction product of a secondary amine compound and an epoxy compound, and the like. And as the compound containing two hydroxyl groups and a tertiary amino group, there may be mentioned, for example, N-alkyldialkanolamine compounds such as N-methyldiethanolamine and N-ethyldiethanolamine, an ethylene oxide adduct of a primary amine compound, a reaction product of a primary amine compound and an epoxy compound, and the like.

Moreover, as the compound containing a hydroxyl group and a basic nitrogen-containing heterocyclic group, utilizable are, for example, compounds having a heterocycle containing a tertiary basic nitrogen such as pyridine, pyrazine, triazine and quinoline, and a hydroxyl group, for example, hydroxypyridine, pyridinemethanol, pyridineethanol, and the like. Furthermore, even a heterocyclic compound containing a secondary basic nitrogen such as piperidine and piperazine can be used by converting the compound to a tertiary one by an alkylation treatment and to have a hydroxyl group.

In addition, 2 moles of a compound containing one hydroxyl group may be reacted with 1 mole of the compound represented by the above general formula (1) to introduce a basic nitrogen-containing group into the main chain terminus, and also a compound containing two hydroxyl groups may be reacted with the compound represented by the above general formula (1) in such manner that the amount of an isocyanate group become excessive than a hydroxyl group to introduce a basic nitrogen-containing group into the main chain. Such compounds introduced with a basic nitrogen-containing group into the main chain are more preferred.

Furthermore, a compound having no basic nitrogen-containing group can also be used for the reaction. There may be mentioned, for example, low molecular weight monohydric alcohol compounds such as methanol and ethanol, a monoalkylester compound of (poly)alkylene glycol, the polyester compound, polyether compound and polyacrylic compound containing one hydroxyl group mentioned below, and the like.

A polyester side chain, polyether side chain or polyacrylic side chain is further introduced, by the grafting reaction, into the compounds having one or more carbodiimide groups within the molecule as obtained by using such a method as mentioned above to give carbodiimide compounds containing at least one grafted side chain selected from the group consisting of grafted polyester side chains, grafted polyether side chains and grafted polyacrylic side chains.

Utilizable as a typical method of introducing such side chains into the molecule by the grafting reaction is the method which comprises reacting a polyester compound, polyether compound or polyacrylic compound having a functional group capable of reacting with a Carbodiimide group, for example a carboxyl group, sulfonic acid group, phosphoric acid group, hydroxyl group or amino group, with a carbodiimide group of a carbodiimide compound.

As the functional group-containing polyester compound, there may first be mentioned (1) compounds obtained by ring-opening polymerization of cyclic ester compounds using a hydroxycarboxylic acid, monohydric alcohol, low-molecular-weight diol compound or the like as an initiator (e.g. polyester compounds having a carboxyl group and a hydroxyl group as obtained by ring-opening polymerization of cyclic ester compounds such as ε-caprolactone, γ-butyrolactone, 2-methylcaprolactone, 4-methylcaprolactone, β-propiolactone, δ-valerolactone and β-methyl-δ-valerolactone using, as an initiator, a mono- or polyhydroxycarboxylic acid such as lactic acid, caproic acid, 12-hydroxystearic acid, dimethylolpropionic acid or dimethylolbutanoic acid; hydroxyl group-containing polyester monool compounds obtained by ring-opening polymerization of the cyclic ester compounds mentioned above using, as an initiator, a low-molecular-weight monool compound such as methanol or ethanol; hydroxyl group-containing polyester diol compounds obtained by ring-opening polymerization of the cyclic ester compounds mentioned above using, as an initiator, a low-molecular-weight diol compound such as ethylene glycol or propylene glycol; and the like).

Further, there may be mentioned (2) compounds obtained by self-polycondensation of hydroxycarboxylic acids (e.g. polyester compounds containing a carboxyl group and a hydroxyl group as obtained by polycondensation of monohydroxycarboxylic acids such as lactic acid, caproic acid and 12-hydroxystearic acid, and the like).

There may further be mentioned (3) compounds obtained by polycondensation of low-molecular-weight diol compounds and low-molecular-weight dicarboxylic acid compounds (e.g. hydroxyl group-containing polyester diol compounds and the like obtained by reacting a low-molecular-weight diol compound component, for example a linear glycol such as ethylene glycol, 1,3-propanediol, 1,4-butanediol or 1,6-hexanediol or a branched glycol such as 1,2-propanediol, neopentyl glycol, 3-methyl-1,5-pentanediol or ethylbutylpropanediol, with a low-molecular-weight dicarboxylic acid component, for example a saturated or unsaturated aliphatic dicarboxylic acid such as succinic acid, adipic acid, azelaic acid, sebacic acid or maleic acid or an aromatic dicarboxylic acid such as phthalic acid in the presence of an excess of the low-molecular-weight diol compound, and the like).

There may also be mentioned (4)phosphate ester compounds derived from products of ring-opening polymerization of cyclic ester compounds using a monohydric alcohol as an initiator (e.g. phosphoric acid group-containing polyester diol compounds obtained by esterification of the polyester monool compounds mentioned above with phosphoric acid, etc.), and (5) compounds obtained by ring-opening polymerization of cyclic ester compounds using an amino group-containing sulfonic acid compound as an initiator (e.g. sulfonic acid group-containing polyester diol compounds obtained by ring-opening polymerization of the cyclic ester compounds using taurine or a like amino group-containing sulfonic acid compound as an initiator, and the like).

There may further be mentioned (6)sulfurous acid gas adducts derived from products of ring-opening polymerization of cyclic ester compounds using a monohydric alcohol as an initiator (e.g. sulfonic acid group-containing polyester diol compounds obtained by addition of sulfurous acid gas to the above-mentioned polyester monool compounds, and the like). Additionally, among such polyester compounds having a phosphoric acid group or a sulfonic group, those compounds having a polyester chain obtained by ring-opening polymerization of polycaprolactone are preferred.

As the functional group-containing polyether compound, there may first be mentioned (1) compounds obtained by ring-opening polymerization of cyclic ether compounds using a hydroxycarboxylic acid, monohydric alcohol, low-molecular-weight diol compound or the like as an initiator (e.g. polyether compounds having a carboxyl group and a hydroxyl group as obtained by ring-opening polymerization of cyclic ether compounds such as ethylene oxide, propylene oxide, trimethylene oxide, tetrahydrofuran and tetrahydropyran using, as an initiator, a mono- or polyhydroxycarboxylic acid such as lactic acid, caproic acid, 12-hydroxystearic acid, dimethylolpropionic acid or dimethylolbutanoic acid; hydroxyl group-containing polyether monool compounds obtained by ring-opening polymerization of the cyclic ether compounds mentioned above using, as an initiator, a low-molecular-weight monool compound such as methanol or ethanol; hydroxyl group-containing polyether diol compounds obtained by ring-opening polymerization of the cyclic ether compounds mentioned above using, as an initiator, a low-molecular-weight diol compound such as ethylene glycol or propylene glycol, and the like).

There may also be mentioned (2)phosphate ester compounds derived from products of ring-opening polymerization of cyclic ether compounds using a monohydric alcohol as an initiator (e.g. phosphoric acid group-containing polyether compounds obtained by esterification of the polyether monool compounds mentioned above with phosphoric acid).

Further, there may be mentioned (3) compounds obtained by ring-opening polymerization of cyclic ether compounds using an amino group-containing sulfonic acid compound as an initiator (e.g. sulfonic acid group-containing polyether compounds obtained by ring-opening polymerization of the cyclic ether compounds using taurine or a like amino group-containing sulfonic acid compound as an initiator).

There may further be mentioned (4)sulfurous acid gas adducts derived from products of ring-opening polymerization of cyclic ether compounds using a monohydric alcohol as an initiator (e.g. sulfonic acid group-containing polyether compounds obtained by addition of sulfurous acid gas to the above-mentioned polyether monool compounds).

As the above-mentioned functional group-containing polyacrylic compound, preferred are (meth)acrylic polymers obtained by polymerization of a monomer composition comprising at least one monomer selected from among (meth)acrylic monomers having at least one group selected from the group consisting of a carboxyl group, sulfonic acid group, phosphoric acid group, hydroxyl group and amino group. Examples thereof include, e.g. (meth)acrylic polymers obtained by polymerization of at least one monomer component selected from among such monomers as carboxyl group-containing (meth)acrylic monomers: (meth) acrylic acid, crotonic acid, maleic acid, fumaric acid, citraconic acid, itaconic acid, etc.; sulfonic acid group-containing (meth)acrylic monomers: sulfoethyl (meth) acrylate, sulfopropyl (meth)acrylate, etc.; phosphoric acid group-containing (meth)acrylic monomers: 2-methacrylbyloxyethyl acid phosphate, tris(acryloyloxyethyl)phosphate, etc.; hydroxyl group-containing (meth)acrylic monomers: (meth)acrylic acid hydroxyalkyl esters such as 2-hydroxyethyl (meth)acrylate, hydroxypropyl (meth)acrylate and hydroxypentyl (meth)acrylate; amino group-containing (meth)acrylic monomers: (meth)acrylamide, N-methyl (meth)acrylamide, N-ethyl(meth)acrylamide, N-propyl (meth)acrylamide, N-butyl(meth)acrylamide, N-hexyl (meth)acrylamide, N-octyl(meth)acrylamide, N,N-dimethylaminoethyl(meth)acrylamide, N,N-diethylaminoethyl(meth)acrylamide, N,N-dimethylaminopropyl(meth)acrylamide, etc., if necessary together with one or more of known monomers (other than the above-mentioned monomers) generally used as reactant components of acrylic resins, for example alkyl esters, styrenic monomers, and the like.

Furthermore, those compounds which have the functional group defined above and contains both a polyester chain and a polyether chain, those polyacrylic compounds which have the functional group defined above and a polyester chain, and those polyacrylic compounds which have the functional group defined above and a polyether chain may also be used. Thus, usable are, for example, compounds obtained by reacting cyclic ester compounds with a polyalkylene glycol or a monoalkyl ether compound derived therefrom, which is used as an initiator, compounds obtained by reacting hydroxyl group-containing polyester compounds with a cyclic ether compound, and polyacrylic compounds obtained by using (meth)acrylic monomers containing a polyester chain within the molecule or (meth)acrylic monomers containing a polyether chain within the molecule.

Those polyester compounds, polyether compounds and polyacrylic compounds which contain a carboxyl group, sulfonic acid group or phosphoric acid group are advantageous from the viewpoint of reactivity with a carbodiimide group.

In cases where the carbodiimide-group containing compound to serve as a basis further has at least one isocyanate group, the hydroxyl group-containing compounds react with the isocyanate group earlier than with the carbodiimide group(s), whereby it becomes difficult to control the reaction. Furthermore, those compounds having two or more hydroxyl groups may possibly cause gelation as a result of crosslinking during a grafting reaction.

Therefore, with those compounds which contain hydroxyl groups alone as the functional groups, it is desirable that they be further reacted with an acid anhydride such as phthalic anhydride, maleic anhydride or succinic anhydride to give polyester compounds, polyether compounds or polyacrylic compounds having one carboxyl group and such compounds be subjected to grafting reaction.

Additionally, among the polyester compounds, polyether compounds or polyacrylic compounds to be introduced into the molecule of a carbodiimide-based compound as a side chain, as for those having a basic nitrogen-containing group, the side chain and basic nitrogen-containing group can be introduced into the carbodiimide-based compound at the same time.

The compounds resulting from intramolecular introduction, by grafting reaction, of at least one of the polyester compounds, polyether compounds or polyacrylic compounds enumerated hereinabove may have no carbodiimide group, or preferably have at least one carbodiimide group. For example, when a side chain is introduced, by grafting reaction, into a polycarbodiimide compound represented by the general formula (1) given hereinabove, a carbodiimide compound represented by the following general formulas (2) and (3) can be obtained.

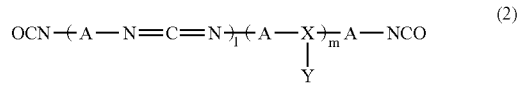

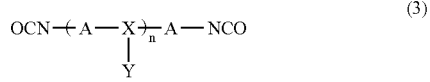

In the above formulas, A is the residue derived from the diisocyanate compound used in synthesizing the polycarbodiimide compound by removal of isocyanate groups. X's are the same or different and each is a trivalent linking group resulting from the reaction of the carbodiimide group with a functional group reactive therewith, Y's are the same or different and each is a polyester chain, polyether chain or polyacrylic chain, and l, m and n each represents an integer of not smaller than 1.

As for the trivalent linking group represented by X in the above formula, for instance, the linking group formed by the reaction between a carbodiimide group and a carboxyl group is represented by the general formula (4) or (5) given below, the linking group formed by the reaction between a carbodiimide group and a hydroxyl group by the general formula (6) or (7) given below, the linking group formed by the reaction between a carbodiimide group and an amino group by the general formula (8) given below, the linking group formed by the reaction between a carbodiimide group and a sulfonic acid group by the general formula (9) given below, and the linking group formed by the reaction between a carbodiimide group and a phosphoric acid group by the general formula (10) given below.

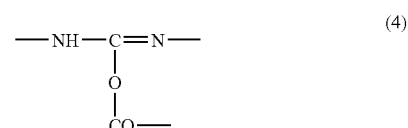

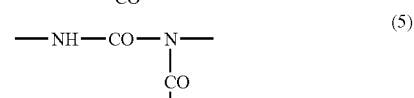

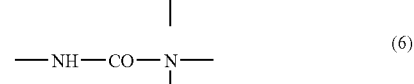

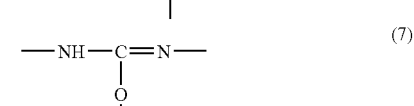

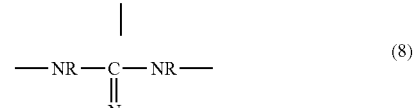

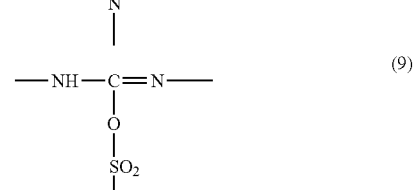

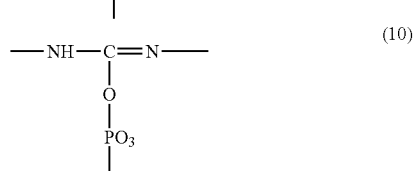

In the above general formulas, R represents a hydrogen atom or a hydrocarbon group containing at least one carbon atom. Furthermore, it is also possible to react the carbodiimide-based compounds represented by the general formulas (2) and (3), which have isocyanate groups within the molecule, with a compound having a functional group reactive with an isocyanate group in the same manner as mentioned above. Consequently, the same compound can be obtained as one obtainable by reacting a component forming a side chain with a carbodiimide group-containing compound in which an isocyanate group is eliminated in advance.

For example, carbodiimide-based compounds obtainable by reacting a compound having one hydroxyl group with isocyanate groups at both termini of the carbodiimide-based compounds represented by the general formulas (2) and (3) can be represented by the following general formulas (11) and (12). Theses compounds can also be utilized as the carbodiimide-based compounds in the practice of the invention.

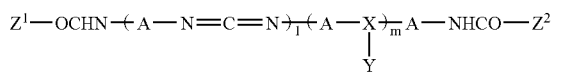
(11)

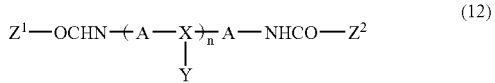
(12)

In the above general formulas, $Z^1$ and $Z^2$ each independently represents the residue resulting from removal of the functional group of the isocyanate group-reactive functional group-containing compound, which may be different in structure. A is the residue resulting from removal of isocyanate groups from the diisocyanate compound used for the synthesis of the polycarbodiimide compound. X's are the same or different and each is a trivalent linking group resulting from the reaction of the carbodiimide de group with the functional group reactive therewith, Y's are the same or different and each is a polyester chain, polyether chain or polyacrylic chain, and l, m and n each represents an integer of not smaller than 1. In cases where the compound of the general formula (11) is used as such or the compound of the general formula (12) is used, either of $Z^1$, $Z^2$ and Y is required to have at least one basic nitrogen-containing group. The basic nitrogen-containing group is introduced into a main chain for those having a nitrogen-containing group as the above $Z^1$ and $Z^2$, or into a side chain for those having a nitrogen-containing group as the above Y.

On the other hand, in the general formula (11), in case where a basic nitrogen-containing group is not contained in any of $Z^1$, $Z^2$ and Y, such compound can be used by introducing a basic nitrogen-containing group into the molecule by subjecting residual carbodiimide groups to grafting reaction with an amino acid, or the above compound containing a hydroxyl group and basic nitrogen-containing group, or the like.

In carrying out the reactions mentioned above, namely the above-mentioned ring-opening reaction of cyclic ester compounds using a hydroxyl group-containing compound as an initiator, polycondensation reaction of hydroxycarboxylic acids, polycondensation reaction of low-molecular-weight diol compounds with low-molecular-weight dicarboxylic acid compounds, ring-opening reaction of hydroxyl group-containing ester compounds with acid anhydrides, ring-opening reaction of cyclic ether compounds, ring-opening reaction of hydroxyl group-containing ether compounds with acid anhydrides, reaction of a carbodiimide group with a carboxyl, hydroxyl or the like group and, further, reaction of an isocyanate group with a hydroxyl group, and the like, the conventional methods can be utilized.

As a means of improving the developability, when the above carbodiimide-based compound does not contain a carbodiimide group within the molecule, (a) a method comprising introducing an acid value by reacting the compound with an acid anhydride such as succinic anhydride and trimellitic anhydride can be considered as one means. When a carbodiimide group is contained within the molecule, the developability can be improved by (b) a method comprising, without introducing an acid value, reacting a pigment having a functional group reactive with a carbodiimide group and a carbodiimide group in the molecule of the carbodiimide-based compound, and making a basic nitrogen-containing group introduced into the molecule freely occur. In the invention, either means (a) or (b) can be used.

Moreover, as for the above-mentioned carbodiimide-based compound, even when the order of reactions of the respective reactants is changed, the compound finally obtained has the same molecular structure, and the performance characteristics obtainable do not differ.

Therefore, referring to the compounds of the above general formulas (11) and (12), the method for producing a side chain which comprises first synthesizing a carbodiimide group-reactive functional group-containing polyester compound, and then reacting this with a carbodiimide group for, e.g. the introduction of a grafted polyester chain, has been described hereinabove. According to an alternative method, such a side chain can be introduced by reacting a carbodiimide group-reactive functional group-containing compound with a carbodiimide group, followed by intramolecularly introducing polyester chains.

That is, in the case of introduction of a grafted polyester side chain or grafted polyether side chain, use may be made of the method which comprises first reacting a hydroxycarboxylic acid with a carbodiimide group for intramolecular introduction of a hydroxyl group into the carbodiimide compound and then subjecting a cyclic polyester compound or cyclic polyether compound to ring-opening polymerization for graft bonding of a polyester chain or polyether chain. In the case of introduction of a grafted polyacrylic chain, for example, use may be made of the method which comprises first reacting a compound having a radically polymerizable unsaturated double bond and a functional group reactive with a carbodiimide group such as an acid group and hydroxyl group with a carbodiimide group, thereby introducing the radically polymerizable unsaturated double bond into the molecule of the carbodiimide compound, and then polymerizing an acrylic monomer with the resultant to bind a polyacrylic chain by a graft bonding. As regarding the order of these reactions, it is desirable to carry out the synthesis under such condition that the amount of undesirable side-reaction product becomes smallest.

As a preferable mode of the above carbodiimide-based compound having a grafted side chain within the molecule, in synthesizing a compound containing one or more carbodiimide groups (compounds represented by the general formulas (2) and (11)), both a compound having no grafted side chain within the molecule (m=0) and a compound having no carbodiimide group within the molecule (l=0) are possibly generated.

Then, as a method of synthesizing a compound having one or more grafted side chain and carbodiimide group within the molecule alone, there may be mentioned the method described below using, as bases, the compound represented by the above general formula (1) and the compound represented by the above general formula (3) as derived by introduction of a grafted polyester chain, grafted polyether chain or grafted polyacrylic chain into each carbodiimide group.

First, the compound of general formula (1) or of general formula (3) is used, and the isocyanate groups on both ends are reacted with a diol compound to give a compound having a hydroxyl group at each terminus. For example, the compound obtained by reacting 1 mole of the compound of general formula (1) with 2 moles of a diol compound is represented by the general formula (13) given below, while the compound obtained by reacting 1 mole of the compound of general formula (3) with 2 moles of a diol compound is represented by the general formula (14) given below.

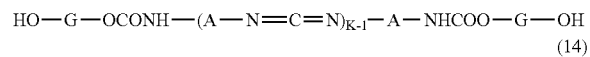
(13)

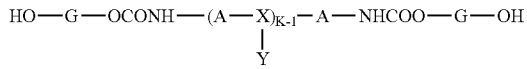
(14)

In the above general formulas, G may be the same or different and each represents the diol compound residue resulting from removal of the hydroxyl group that has reacted with an isocyanate group.

And, those compounds obtained by reacting the above-mentioned carbodiimide group-containing diol compound (compound represented by the general formula (13)) with a diisocyanate compound having a grafted polyester chain, grafted polyether chain or grafted polyacrylic chain (compound represented by the general formula (3)) or, conversely, reacting a diol compound having such a graft side chain (compound represented by the general formula (14)) with a carbodiimide group-containing diisocyanate compound (compound represented by the general formula (1)) are compounds essentially having at least one of the grafted side chain and carbodiimide group. Furthermore, with this method, it is preferable to use a diol compound containing a basic nitrogen-containing group within the molecule since the basic nitrogen-containing group can be introduced into the molecule at the same time.

As described above, the side chain can be easily introduced into a carbodiimide-based compound when a grafting reaction is used, but it is also possible to introduce a side chain into the carbodiimide-based compound other than the grafting reaction. As such method, for example, a method which comprises subjecting a polycarbodiimide compound represented by the general formula (1) to chain extension using a chain extender having a polyester chain, polyether chain or polyacrylic chain can be used.

Such chain extenders include such polyester chain-containing ones as compounds obtained by ring-opening polymerization of the above-mentioned cyclic polyester compound on a polyol compound having three or more hydroxyl groups, for example trimethylolpropane or pentaerythritol, compounds obtained by polycondensation of the above-mentioned low-molecular-weight dicarboxylic acid and the above-mentioned low-molecular-weight diol compound partly in combination with a triol compound, and compounds obtained by reacting a diol monocarboxylic acid, such as dimethylolpropionic acid, with an epoxy compound having a polyester chain within the molecule. As polyether chain-containing ones, there may be mentioned compounds obtained by ring-opening polymerization of the above-mentioned cyclic polyether compound on the above-mentioned polyol compound, and the like. As polyacrylic chain-containing ones, there may be mentioned compounds obtained by reacting the above-mentioned polyol compound with a carboxyl group-containing (meth)acrylic polymer, and the like.

The carbodiimide-based compound having at least one side chain selected from the group consisting of polyester side chains, polyether side chains and polyacrylic side chains and a basic nitrogen-containing group within the molecule which is obtainable by reacting the materials mentioned above preferably contains 0.02 to 4 mmol, and more preferably 0.05 to 3 mmol of a basic nitrogen-containing group per 1 g of the carbodiimide-based compound. When the amount of the basic nitrogen-containing group per 1 g of the carbodiimide-based compound falls within the above range, preferable pigment disperion stability can be obtained.

In the above-mentioned carbodiimide-based compounds, the polyester chain, polyether chain or polyacrylic chain to be introduced as a side chain is not particularly restricted but may be any of those which are effective in improving the dispersion stability of pigments in a dispersion medium. Preferably, it has a formula weight of not less than 200 but not more than 10,000, more preferably not less than 300 but not more than 5,000.

In the case where the above carbodiimide-based compounds have one or more carbodiimide groups within the molecule, a carbodiimide equivalent is preferably 100 to 50,000, more preferably within the range of 200 to 10,000. If the carbodiimide equivalent is within the above range, when an organic pigment and carbon black each having a functional group reactive with a carbodiimide group are used, the effect for improving the dispersion stability is improved. Furthermore, color filters having preferable contrast and high transmissivity can be finally obtained when the organic pigment is used, and black matrices having more improved insulating property and shielding property can be finally obtained when carbon black is used. Additionally, the carbodiimide equivalent refers to a number represented by (molecular weight of the carbodiimide-based compound)/(number of carbodiimide group within the molecule of the carbodiimide-based compound).

The carbodiimide-based compound to be used in the practice of the invention preferably has a number average molecular weight of not less than 1,000 but not more than 100,000, more preferably not less than 1,000 but not more than 50,000. When the number average molecular weight of the carbodiimide-based compound is excessively high, it becomes difficult for dispersions prepared by dispersing a carbodiimide group-reactive functional group-containing pigment in a dispersion medium and pigment dispersion-based resist compositions prepared therefrom to have an appropriate level of viscosity, and this is unfavorable in particular when a high-concentration pigment dispersion composition is required. On the other hand, when the number average molecular weight is excessively low, the dispersion stability of the above-mentioned pigments in a dispersion medium unfavorably decreases and, in particular when carbon black is used as the pigment, the black matrix coatings finally produced unfavorably show deteriorated insulating properties.

Therefore, the amount of the basic nitrogen-containing group, the number and formula weight of a polyester side chain, polyether side chain, polyacrylic side chain, etc. occurring in the molecule, and carbodiimide equivalent, etc. of the carbodiimide-based compound are preferably adjusted in an appropriate manner according to the performance characteristics required in the intended field of application.

The carbodiimide-based compounds enumerated hereinabove can be used alone or two or more of them may be used in combination. The carbodiimide-based compounds can be used as compounds for pigment treatment which are used for treating organic pigments and carbon black having an adsorption part with a basic nitrogen-containing group, and such compounds for pigment treatment are one aspect of the present invention. The carbodiimide-based compounds further having one or more carbodiimide groups in the molecule are compounds for pigment treatment suited for the pigment dispersion treatment of organic pigments and carbon black having an adsorption part with a basic nitrogen-containing group and a functional group reactive with a carbodiimide group.

Now, the method of treating the above-mentioned pigments using the carbodiimide-based compound specified herein is described.

The treatment, so referred to herein, comprises treating the whole or part of the surface of dispersed particles of any of the pigments mentioned above using the carbodiimide-based compound of the invention. More specifically, there may be mentioned the method which comprises kneading or milling, for dispersion/treatment, a mixture composed of the above-mentioned pigment and carbodiimide-based compound, if necessary together with a dispersion medium and another or other additives and so forth, using a roll mill, kneader, high-speed stirrer, bead mill, ball mill, sand mill, ultrasonic dispersing apparatus or high-pressure dispersing apparatus, for instance.

In carrying out the above pigment treatment using the carbodiimide-based compound alone without using any dispersion medium, the mixture is preferably warmed to a temperature which is not lower than the melting point of the carbodiimide-based compound, and when a pigment having a functional group reactive with a carbodiimide group is treated with a carbodiimide-based compound having a carbodiimide group within the molecule, the mixture is preferably warmed to a temperature at which the reaction between said functional groups can be promoted. The reaction-promoting temperature mentioned above is generally not higher than 100° C., preferably about 40 to 80° C. The treated pigment obtained by such method can be roughly ground or made into a chip-like form for later utilization following dispersion in an appropriate dispersion medium in an arbitrary field of application.

On the other hand, when the treatment is carried out in an organic dispersion medium or aqueous dispersion medium capable of dissolving the carbodiimide-based compound to be used in the practice of the invention and stably dispersing the pigment in question while dispersing the pigment in that medium, the treatment can be carried out at relatively low temperatures. But when a pigment having a functional group reactive with a carbodiimide group is treated with a carbodiimide-based compound having a carbodiimide group within the molecule, the treatment is more preferably carried out with warming to a temperature at which the reaction mentioned above can be promoted. In cases where the treatment is carried out while finely dispersing the above pigment in a dispersion medium which is adequately used in the field of inks or paints, the treatment product as such can be used as a pigment dispersion in preparing inks or paints.

As examples of the dispersion medium adequately utilized in the field of inks or paints, there may be mentioned, among organic dispersion media, (poly)alkylene glycol monoalkyl ethers such as ethylene glycol monomethyl ether, ethylene glycol monoethyl ether, diethylene glycol monomethyl ether, diethylene glycol monoethyl ether, propylene glycol monoethyl ether and propylene glycol monoethyl ether; (poly)alkylene glycol monoalkyl ether acetates such as ethylene glycol monomethyl ether acetate, ethylene glycol monoethyl ether acetate and propylene glycol monomethyl ether acetate; ethers such as diethylene glycol diethyl ether, diethylene glycol methyl ethyl ether and tetrahydrofuran; ketones such as methyl ethyl ketone, methyl isobutyl ketone, cyclohexanone, 2-heptanone and 3-heptanone; lactic acid alkyl esters such as methyl 2-hydroxypropionate and ethyl 2-hydroxypropionate; esters such as ethyl 2-hydroxy-2-methylpropionate, 3-methyl-3-methoxybutyl propionate, methyl 3-methoxypropionate, ethyl 3-ethoxypropionate, ethyl ethoxyacetate, ethyl hydroxyacetate, ethyl acetate, n-butyl acetate, isobutyl acetate, n-butyl propionate, methyl acetoacetate, n-amyl formate and ethyl pyruvate; aromatic hydrocarbons such as toluene and xylene; amides such as N-methylpyrrolidone, N,N-dimethylformamide and N,N-dimethylacetamide; and alcohols such as isopropyl alcohol and normalpropyl alcohol. These dispersion media may be used singly or as a mixture of two or more of them.

The aqueous medium may consist of water alone or a combination of water and a water-miscible organic dispersion medium.

Further, the proportion of the carbodiimide-based compound for the above pigment treatment is preferably not less than 3 parts by mass but not more than 100 parts by mass, more preferably not less than 5 parts by mass but not more than 50 parts by mass, relative to 100 parts by mass of the pigment (or the sum of the pigments used). Preferably, that proportion is adjusted according to the amount of the carbodiimide group-reactive functional group occurring on the pigment surface and to the required performance characteristics such as dispersion performance, fluidity and insulating properties.

The treated pigments thus obtained are suitably utilized in the fields of printing inks, paints, pigment dispersion-based resist compositions for black matrices, pigment dispersion-based resist compositions for color filters, inks for ink jet, inks for writing materials, ribbon inks, liquid developers and the like, if necessary after supplementation with one or more of various binder resins, solvents, surfactants and other additives.

The pigment dispersion-based resist composition for black matrices and color filters as a preferred example of the use of the treated pigment according to the invention is now described in further detail.

The pigment dispersion-based resist composition is a resist composition which can be cured upon irradiation with actinic rays and can be developed with an alkali. It is mainly composed of the treated pigment of the invention (treated carbon black or treated organic pigment), a film-forming resin, a photopolymerizable compound, a photopolymerization initiator and a solvent, if necessary together with one or more appropriate additives, for example a polymerization inhibitor.

As for the treated carbon black constituting the pigment dispersion-based resist composition for black matrices according to the invention, one which, once dispersed, hardly form aggregates is preferably used so that highly insulating films may be formed.

As for the treated carbon black constituting the pigment dispersion-based resist composition for black matrices, a carbon black species whose mean primary particle size is small and not greater than 0.15 μm is preferred. When such a carbon black species is dispersed, the hue is preferably adjusted to neutral black by adding a complementary color pigment as necessary.

As for the carbodiimide group-reactive functional group-containing organic pigment for obtaining the treated organic pigment which constitutes the pigment dispersion-based resist composition for color filters according to the present invention, a carbodiimide group-reactive function group-containing organic pigment of high grade is preferably utilized for forming coatings having a vivid hue.

The film-forming resins for constituting the pigment dispersion-based resist composition of the invention include carboxyl group-containing, alkali-soluble copolymer resins obtained by reacting a carboxyl group-containing unsaturated monomer, such as acrylic acid, methacrylic acid, itaconic acid, maleic acid, maleic anhydride, a maleic acid monoalkyl ester, citraconic acid, citraconic anhydride, a citraconic acid monoalkyl ester, with at least one monomer selected from the group consisting of styrene, 2-hydroxyethyl acrylate, 2-hydroxyethyl methacrylate, allyl acrylate, allyl methacrylate, benzyl acrylate, benzyl methacrylate, glycerol monoacrylate, glycerol methacrylate, N-phenylmaleimide, polystyrene macromonomers and polymethyl methacrylate macromonomers. They can be used singly or as a mixture of two or more of them.

As the photopolymerizable compound which constitutes the pigment dispersion-based resist composition of the invention, there may be mentioned a monomer or oligomer having a photopolymerizable unsaturated bond(s), and the like.

As example of the monomer having one photopolymerizable unsaturated bond within the molecule, there may be mentioned alkyl methacrylates or acrylates such as methyl methacrylate, butyl methacrylate, 2-ethylhexyl methacrylate, methyl acrylate, butyl acrylate and 2-ethylhexyl acrylate; aralkyl methacrylates or acrylates such as benzyl methacrylate and benzyl acrylate; alkoxyalkyl methacrylates or acrylates such as butoxyethyl methacrylate and butoxyethyl acrylate; aminoalkyl methacrylates or acrylates such as N,N-dimethylaminoethyl methacrylate and N,N-dimethylaminoethyl acrylate; methacrylic acid esters or acrylic acid esters of polyalkylene glycol monoalkyl ethers such as diethylene glycol monoethyl ether, triethylene glycol monobutyl ether and dipropylene glycol monomethyl ether; methacrylic acid esters or acrylic acid esters of polyalkylene glycol monoaryl ethers such as hexaethylene glycol monophenyl ether; isobornyl methacrylate or acrylate; glycerol methacrylates or acrylates; 2-hydroxyethyl methacrylate or acrylate; or the like.

As example of the monomer having two or more photopolymerizable unsaturated bonds within the molecule, there may be mentioned bisphenol A dimethacrylate, 1,4-butanediol dimethacrylate, 1,3-butylene glycol dimethacrylate, diethylene glycol dimethacrylate, glycerol dimethacrylate, neopentyl glycol dimethacrylate, polyethylene glycol dimethacrylate, polypropylene glycol dimethacrylate, tetraethylene glycol dimethacrylate, trimethylolpropane trimethacrylate, pentaerythritol trimethacrylate, pentaerythritol tetramethacrylate, dipentaerythritol tetramethacrylate, dipentaerythritol hexamethacrylate, dipentaerythritol pentamethacrylate, bisphenol A diacrylate, 1,4-butanediol diacrylate, 1,3-butylene glycol diacrylate, diethylene glycol diacrylate, glycerol diacrylate, neopentyl glycol diacrylate, polyethylene glycol diacrylate, polypropylene glycol diacrylate, tetraethylene glycol diacrylate, trimethylolpropane triacrylate, pentaerythritol triacrylate, pentaerythritol tetraacrylate, dipentaerythritol tetraacrylate, dipentaerythritol hexaacrylate, dipentaerythritol pentaacrylate, and the like. These photopolymerizable compounds can be used singly or in combination of two or more of them.

The photopolymerization initiators which constitute the pigment dispersion-based resist composition of the invention are not particularly restricted but include, for example, benzophenone, N,N'-tetraethyl-4,4'-diaminobenzophenone, 4-methoxy-4'-dimethylaminobenzophenone, benzil, 2,2-diethoxyacetophenone, benzoin, benzoin methyl ether, benzoin isobutyl ether, benzil dimethyl ketal, α-hydroxyisobutyrophenone, thioxanthone, 2-chlorothioxanthone, 1-hydroxycyclohexyl phenyl ketone, tert-butylanthraquinone, 1-chloroanthraquinone, 2,3-dichloroanthraquinone, 3-chloro-2-methylanthraquinone, 2-ethylanthraquinone, 1,4-naphthoquinone, 1,2-benzanthraquinone, 1,4-dimethylanthraquinone, 2-phenylanthraquinone, triazine type photopolymerization initiators, and the like. These photopolymerization initiators are used singly or in combination of two or more of them.

As the solvent which constitutes the pigment dispersion-based resist composition of the invention, there may be mentioned the same as the dispersion medium mentioned hereinabove and preferably is one having a boiling point of 100 to 220° C. at atmospheric pressure ($1.013 \times 10^2$ kPa) as selected from among ester type organic solvents, ether type organic solvents, ether ester type organic solvents, ketone type organic solvents, aromatic hydrocarbon solvents, nitrogen-containing organic solvents, and the like.

As specific examples of such organic solvents, there may be mentioned ether type organic solvents such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, propylene glycol monomethyl ether, propylene glycol monoethyl ether, propylene glycol monobutyl ether, diethylene glycol diethyl ether, diethylene glycol dimethyl ether and diethylene glycol methyl ethyl ether; ether ester type organic solvents such as ethylene glycol monomethyl ether acetate, ethylene glycol monoethyl ether acetate, ethylene glycol monobutyl ether acetate, propylene glycol monomethyl ether acetate and propylene glycol monoethyl ether acetate; ketone type organic solvents such as methyl isobutyl ketone, cyclohexanone, 2-heptanone and δ-butyrolactone; ester type organic solvents such as methyl 2-hydroxypropionate, ethyl 2-hydroxypropionate, ethyl 2-hydroxy-2-methylpropionate, 3-methyl-3-methoxybutyl propionate, methyl 3-methoxypropionate, ethyl 3-methoxypropionate, methyl 3-ethoxypropionate, ethyl 3-ethoxypropionate, ethyl ethoxyacetate, ethyl hydroxyacetate and n-amyl formate; nitrogen-containing organic solvents such as N-methylpyrrolidone, N,N-dimethylformamide and N,N-dimethylacetamide; and the like. These may be used singly or as a mixture of two or more of them.

Preferred among these organic solvents from the solubility, dispersibility, applicability and the like viewpoint are diethylene glycol dimethyl ether, diethylene glycol methyl ethyl ether, ethylene glycol monomethyl ether acetate, propylene glycol monomethyl ether acetate, propylene glycol monoethyl ether acetate, cyclohexanone, 2-heptanone, ethyl 2-hydroxypropionate, 3-methyl-3-methoxybutyl propionate, ethyl 3-methoxypropionate, methyl 3-ethoxypropionate, n-amyl formate and the like. Propylene glycol monomethyl ether acetate is more preferred.

Further, from the viewpoint of the solubility of the alkali-soluble resin, the dispersibility of the pigment, the applicability and the like, such organic solvents are preferably used in an amount of not less than 50% by mass, more preferably not less than 70% by mass, relative to the whole amount of the organic solvents used in the pigment dispersion-based resist composition of the invention.

When the content of an organic solvent(s) having a boiling point of 220° C. or above is high, the organic solvent may not be fully evaporated but partly remain in the dried coatings on the occasion of prebaking the coatings applied and formed, hence the heat resistance of the dried coatings may be deteriorated. When the content of an organic solvent(s) with a boiling point below 100° C. is high, it becomes difficult to apply the composition evenly and uniformly and, accordingly, it may become impossible to obtain coatings excellent in surface smoothness.

Furthermore, the pigment dispersion-based resist composition of the invention may contain, according to need, one or more of various additives such as other photopolymerizable compounds, thermal polymerization inhibitors, ultraviolet absorbers and antioxidants, each in an appropriate amount.

A method of producing the pigment dispersion-based resist composition of the invention using the materials mentioned above is now described.

The method of producing the pigment dispersion-based resist composition of the invention is an example of the mode of embodiment of the present invention and is by no means limitative of the scope of the present invention.

In producing the pigment dispersion-based resist composition of the invention from the constituent materials described above, use may be made of the method which comprises adding the above-mentioned photopolymerizable compound, photopolymerization initiator and film-forming resin, if necessary together with an organic solvent and another additive or other additives, to the pigment dispersion composition prepared by dispersing the treated pigment by the method described above, and mixing them together using a high-speed stirring apparatus, high-pressure emulsifying apparatus, bead mill, three-roll mill, sand mill, kneader, etc.

The pigment dispersion composition of the invention has good dispersion stability and fluidity even at high pigment content levels and, when carbon black is used as the pigment, the coatings formed therefrom show great hiding power and good insulating properties even when they are thin films and, when an organic pigment having an adsorption part with a basic nitrogen-containing group is used as the pigment, the coatings have high permeability and high contrast. Therefore, for example, the pigment dispersion composition of the invention can be adequately used as a material for producing black matrices which are required to have high insulating properties and in a pigment dispersion-based resist composition for color filters which are required to have high permeability and high contrast.

Furthermore, the pigment dispersion-based resist composition thus obtained has a very excellent development characteristic that uncured coatings can be clearly removed at short times in the development.

BEST MODE FOR CARRYING OUT THE INVENTION

The following examples illustrate the present invention more specifically. They are, however, by no means limitative of the scope of the invention. In the following examples, "part(s)" denotes "part(s) by mass", unless otherwise specified.

[Preparation of Carbodiimide-Based Compounds for Use as Compounds for Pigment Treatment]

<a. Preparation of Polyester Side Chain-Containing Carbodiimide-Based Compounds>

PREPARATION EXAMPLE a-1

A four-necked flask equipped with a reflux condenser, nitrogen gas inlet tube, stirring rod and thermometer was charged with 57 parts of an isocyanate group-containing polycarbodiimide compound with a carbodiimide equivalent of 315 and 16 parts of methyl diethanolamine, the mixture was maintained at about 100° C. for 2 hours to allow the isocyanate group to react with the hydroxyl group. Then, 97.7 parts of propylene glycol monomethyl ether acetate was charged, 178.7 parts of a carboxyl group-terminated caprolactone ring-opening polymerization product with a molecular weight of 1,000 was added, and the whole mixture was maintained at about 90° C. to allow the carbodiimide group to react with the carboxyl group. Thereafter, 97.7 parts of propylene glycol monomethyl ether acetate was added. A compound (a-1) with a number average molecular weight of about 3,800 and a basic nitrogen-containing group amount of 0.5275 mmol was thus obtained.

PREPARATION EXAMPLE a-2

A compound (a-2) with a number average molecular weight of about 5,500 and a basic nitrogen-containing group amount of 0.3600 mmol was obtained in the same manner as in Preparation Example a-1 except that a polycaprolactone ring-opening polymerization product with a molecular weight of 1,500 was used in lieu of the polycaprolactone ring-opening polymerization product with a molecular weight of 1,000.

PREPARATION EXAMPLE a-3

A four-necked flask equipped with a reflux condenser, nitrogen gas inlet tube, stirring rod and thermometer was charged with 52.5 parts of an isocyanate group-containing polycarbodiimide compound with a carbodiimide equivalent of 315 and 14.7 parts of methyl diethanolamine, the mixture was maintained at about 100° C. for 2 hours to allow the isocyanate group to react with the hydroxyl group. Then, 99.5 parts of propylene glycol monomethyl ether acetate was charged, 171.7 parts of a carboxyl group-terminated caprolactone ring-opening polymerization product with a molecular weight of 1,000 was added, and the whole mixture was maintained at about 90° C. to allow the carbodiimide group to react with the carboxyl group. Thereafter, 12.4 parts of succinic anhydride was added and the mixture was maintained at about 90° C. to allow the isocyanate group and carboxyl group to react. Then, 99.5 parts of propylene glycol monomethyl ether acetate was added, and a compound (a-3) with a number average molecular weight of about 4,100, acid value of 27.6 mgKOH/g, and a basic nitrogen-containing group amount of 0.4919 mmol was thus obtained.

PREPARATION EXAMPLE a-4

A compound (a-4) with a number average molecular weight of about 6,500 and a basic nitrogen-containing group amount of 0.3083 mmol was obtained in the same manner as in Preparation Example a-1 except that a polycaprolactone ring-opening polymerization product with a molecular weight of 2,000 was used in lieu of the polycaprolactone ring-opening polymerization product with a molecular weight of 1,000.

PREPARATION EXAMPLE a-5

A compound (a-5) with a number average molecular weight of about 9,100 and a basic nitrogen-containing group amount of 0.2192 mmol was obtained in the same manner as in Preparation Example a-1 except that a polycaprolactone ring-opening polymerization product with a molecular weight of 3,000 was used in lieu of the polycaprolactone ring-opening polymerization product with a molecular weight of 1,000.

PREPARATION EXAMPLE a-6

A four-necked flask equipped with a reflux condenser, nitrogen gas inlet tube, stirring rod and thermometer was charged with 57 parts of an isocyanate group-containing polycarbodiimide compound with a carbodiimide equivalent of 315 and 16 parts of methyl diethanolamine, the mixture was maintained at about 100° C. for 2 hours to allow the isocyanate group to react with the hydroxyl group. Then, 97.7 parts of propylene glycol monomethyl ether acetate was charged, 90.5 parts of a carboxyl group-terminated caprolactone ring-opening polymerization product with a molecular weight of 1,000 was added, and the whole mixture was maintained at about 90° C. to allow the carbodiimide group to react with the carboxyl group. Thereafter, 106.7 parts of propylene glycol monomethyl ether acetate was added. A compound (a-6) with a number average molecular weight of about 2,400, a carbodiimide equivalent of 1,807 and a basic nitrogen-containing group amount of 0.8216 mmol was thus obtained.

PREPARATION EXAMPLE a-7

A four-necked flask equipped with a reflux condenser, nitrogen gas inlet tube, stirring rod and thermometer was charged with 54 parts of an isocyanate group-containing polycarbodiimide compound with a carbodiimide equivalent of 315, 3.9 parts of methyl diethanolamine, and 59.5 parts of polymethyl methacrylate diol with a molecular weight of 1,000, the mixture was maintained at about 100° C. for 2 hours to allow the isocyanate group to react with the hydroxyl group. Then, 92.4 parts of propylene glycol monomethyl ether acetate was charged, 170.1 parts of a carboxyl group-terminated caprolactone ring-opening polymerization product with a molecular weight of 2,000 was added, and the whole mixture was maintained at about 90° C. to allow the carbodiimide group to react with the carboxyl group. Thereafter, 255.2 parts of propylene glycol monomethyl ether acetate was added. A compound (a-7) with a number average molecular weight of about 8,800, a carbodiimide equivalent of 3,400 and a basic nitrogen-containing group amount of 0.1141 mmol was thus obtained.

PREPARATION EXAMPLE a-8

A four-necked flask equipped with a reflux condenser, nitrogen gas inlet tube, stirring rod and thermometer was charged with 54 parts of an isocyanate group-containing polycarbodiimide compound with a carbodiimide equivalent of 315, 109.4 parts of methyl diethanolamine, and 174.7 parts of isophorone diisocyanate, the mixture was maintained at about 100° C. for 2 hours to allow the isocyanate group to react with the hydroxyl group. Then, 453.7 parts of propylene glycol monomethyl ether acetate was charged, 170.1 parts of a carboxyl group-terminated caprolactone ring-opening polymerization product with a molecular weight of 2,000 was added, and the whole mixture was maintained at about 90° C. to allow the carbodiimide group to react with the carboxyl group. Thereafter, 255.2 parts of propylene glycol monomethyl ether acetate was added. A compound (a-8) with a number average molecular weight of about 15,500, a carbodiimide equivalent of 6,000 and a basic nitrogen-containing group amount of 1.8072 mmol was thus obtained.

PREPARATION EXAMPLE a-9

A four-necked flask equipped with a reflux condenser, nitrogen gas inlet tube, stirring rod and thermometer was charged with 65 parts of an isocyanate group-containing polycarbodiimide compound with a carbodiimide equivalent of 315, 8.2 parts of methyl diethanolamine, and 9.5 parts of 2-pyridine ethanol, the mixture was maintained at about 100° C. for 2 hours to allow the isocyanate group to react with the hydroxyl group. Then, 99.7 parts of propylene glycol monomethyl ether acetate was charged, 209.2 parts of a carboxyl group-terminated caprolactone ring-opening polymerization product with a molecular weight of 2,000 was added, and the whole mixture was maintained at about 90° C. to allow the carbodiimide group to react with the carboxyl group. Thereafter, 129.5 parts of propylene glycol monomethyl ether acetate was added. A compound (a-9) with a number average molecular weight of about 3,786, a carbodiimide equivalent of 2,857 and a basic nitrogen-containing group amount of 0.5275 mmol was thus obtained.

PREPARATION EXAMPLE a-10

A four-necked flask equipped with a reflux condenser, nitrogen gas inlet tube, stirring rod and thermometer was charged with 55 parts of an isocyanate group-containing polycarbodiimide compound with a carbodiimide equivalent of 315, and 8.1 parts of ethylene glycol, the mixture was maintained at about 100° C. for 2 hours to allow the isocyanate group to react with the hydroxyl group. Then, 94.5 parts of propylene glycol monomethyl ether acetate was charged, 179.8 parts of a carboxyl group-terminated caprolactone ring-opening polymerization product with a molecular weight of 1,000 was added, and the whole mixture was maintained at about 90° C. to allow the carbodiimide group to react with the carboxyl group. Thereafter, 94.5 parts of propylene glycol monomethyl ether acetate was added. A compound (a-10) with a number average molecular weight of about 3,700 and a basic nitrogen-containing group amount of 0 mmol was thus obtained.

<b. Preparation of Polyether Side Chain-Containing Carbodiimide-Based Compounds>

PREPARATION EXAMPLE b-1

A four-necked flask equipped with a reflux condenser, nitrogen gas inlet tube, stirring rod and thermometer was charged with 57 parts of an isocyanate group-containing polycarbodiimide compound with a carbodiimide equivalent of 315 and 16 parts of methyl diethanolamine, the mixture was maintained at about 100° C. for 2 hours to allow the isocyanate group to react with the hydroxyl group. Then, 97.7 parts of propylene glycol monomethyl ether acetate was charged, 178.7 parts of a carboxyl group-terminated polyethylene oxide-polypropylene oxide copolymer with a molecular weight of 1,000 was added, and the whole mixture was maintained at about 90° C. to allow the carbodiimide group to react with the carboxyl group. Thereafter, 97.7 parts of propylene glycol monomethyl ether acetate was added. A compound (b-1) with a number average molecular weight of about 3,800 and a basic nitrogen-containing group amount of 0.5275 mmol was thus obtained.

PREPARATION EXAMPLE b-2

A compound (b-2) with a number average molecular weight of about 5,500 and a basic nitrogen-containing group amount of 0.3600 mmol was obtained in the same manner as in Preparation Example b-1 except that a polyethylene oxide-polypropylene oxide copolymer with a molecular weight of 1,500 was used in lieu of the polyethylene oxide-polypropylene oxide copolymer with a molecular weight of 1,500.

PREPARATION EXAMPLE b-3

A four-necked flask equipped with a reflux condenser, nitrogen gas inlet tube, stirring rod and thermometer was charged with 52.5 parts of an isocyanate group-containing polycarbodiimide compound with a carbodiimide equivalent of 315 and 14.7 parts of methyl diethanolamine, the mixture was maintained at about 100° C. for 2 hours to allow the isocyanate group to react with the hydroxyl group. Then, 99.5 parts of propylene glycol monomethyl ether acetate was charged, 171.7 parts of a carboxyl group-terminated polyethylene oxide-polypropylene oxide copolymer with a molecular weight of 1,000 was added, and the mixture was maintained at about 90° C. to allow the carbodiimide group to react with the carboxyl group. Thereafter, 12.4 parts of succinic anhydride was charged, the mixture was maintained at about 90° C. to allow the isocyanate group with the carboxyl group, and 99.5 parts of propylene glycol monomethyl ether acetate was added. A compound (b-3) with a number average molecular weight of about 4,100, acid value of 27.6 mgKOH/g, and a basic nitrogen-containing group amount of 0.4919 mmol was thus obtained.

PREPARATION EXAMPLE b-4

A compound (b-4) with a number average molecular weight of about 6,500 and a basic nitrogen-containing group amount of 0.3083 mmol was obtained in the same manner as in Preparation Example b-1 except that a polyethylene oxide-polypropylene oxide copolymer with a molecular weight of 2,000 was used in lieu of the polyethylene oxide-polypropylene oxide copolymer with a molecular weight of 1,000.

PREPARATION EXAMPLE b-5

A compound (b-5) with a number average molecular weight of about 9,100 and a basic nitrogen-containing group amount of 0.2192 mmol was obtained in the same manner as in Preparation Example b-1 except that a polyethylene oxide-polypropylene oxide copolymer with a molecular weight of 3,000 was used in lieu of the polyethylene oxide-polypropylene oxide copolymer with a molecular weight of 1,000.

PREPARATION EXAMPLE b-6

A four-necked flask equipped with a reflux condenser, nitrogen gas inlet tube, stirring rod and thermometer was charged with 57 parts of an isocyanate group-containing polycarbodiimide compound with a carbodiimide equivalent of 315 and 16 parts of methyl diethanolamine, the mixture was maintained at about 100° C. for 2 hours to allow the isocyanate group to react with the hydroxyl group. Then, 97.7 parts of propylene glycol monomethyl ether acetate was charged, 90.5 parts of a carboxyl group-terminated polyethylene oxide-polypropylene oxide copolymer with a molecular weight of 1,000 was added, and the mixture was maintained at about 90° C. to allow the carbodiimide group to react with the carboxyl group. Thereafter, 106.7 parts of propylene glycol monomethyl ether acetate was added. A compound (b-6) with a number average molecular weight of about 2,400, carbodiimide equivalent of 1,807, and a basic nitrogen-containing group amount of 0.8216 mmol was thus obtained.

PREPARATION EXAMPLE b-7

A four-necked flask equipped with a reflux condenser, nitrogen gas inlet tube, stirring rod and thermometer was charged with 54 parts of an isocyanate group-containing polycarbodiimide compound with a carbodiimide equivalent of 315, 3.9 parts of methyl diethanolamine, and 59.5 parts of polymethyl methacrylate diol with a molecular weight of 1,000, the mixture was maintained at about 100° C. for 2 hours to allow the isocyanate group to react with the hydroxyl group. Then, 92.4 parts of propylene glycol monomethyl ether acetate was charged, 170.1 parts of a carboxyl group-terminated polyethylene oxide-polypropylene oxide copolymer with a molecular weight of 2,000 was added, and the mixture was maintained at about 90° C. to allow the carbodiimide group to react with the carboxyl group. Thereafter, 255.2 parts of propylene glycol monomethyl ether acetate was added. A compound (b-7) with a number average molecular weight of about 8,800, carbodiimide equivalent of 3,400, and a basic nitrogen-containing group amount of 0.1141 mmol was thus obtained.

PREPARATION EXAMPLE b-8

A four-necked flask equipped with a reflux condenser, nitrogen gas inlet tube, stirring rod and thermometer was charged with 54 parts of an isocyanate group-containing polycarbodiimide compound with a carbodiimide equivalent of 315, 109.4 parts of methyl diethanolamine, and 174.7 parts of isophorone diisocyanate, the mixture was maintained at about 100° C. for 2 hours to allow the isocyanate group to react with the hydroxyl group. Then, 453.7 parts of propylene glycol monomethyl ether acetate was charged, 170.1 parts of a carboxyl group-terminated polyethylene oxide-polypropylene oxide copolymer with a molecular weight of 2,000 was added, and the mixture was maintained at about 90° C. to allow the carbodiimide group to react with the carboxyl group. Thereafter, 255.2 parts of propylene glycol monomethyl ether acetate was added. A compound (b-8) with a number average molecular weight of about 15,500, carbodiimide equivalent of 6,000, and a basic nitrogen-containing group amount of 1.8072 mmol was thus obtained.

PREPARATION EXAMPLE b-9

A four-necked flask equipped with a reflux condenser, nitrogen gas inlet tube, stirring rod and thermometer was charged with 65 parts of an isocyanate group-containing polycarbodiimide compound with a carbodiimide equivalent of 315, 8.2 parts of methyl diethanolamine, and 9.5 parts of 2-pyridine ethanol, the mixture was maintained at about 100° C. for 2 hours to allow the isocyanate group to react with the hydroxyl group. Then, 99.7 parts of propylene glycol monomethyl ether acetate was charged, 209.2 parts of a carboxyl group-terminated polyethylene oxide-polypropylene oxide copolymer with a molecular weight of 2,000 was added, and the mixture was maintained at about 90° C. to allow the carbodiimide group to react with the carboxyl group. Thereafter, 129.5 parts of propylene glycol monomethyl ether acetate was added. A compound (b-9) with a number average molecular weight of about 3,786, carbodiimide equivalent of 2,857, and a basic nitrogen-containing group amount of 0.5275 mmol was thus obtained.

PREPARATION EXAMPLE b-10

A four-necked flask equipped with a reflux condenser, nitrogen gas inlet tube, stirring rod and thermometer was charged with 55 parts of an isocyanate group-containing polycarbodiimide compound with a carbodiimide equivalent of 315, and 8.1 parts of ethylene glycol, the mixture was maintained at about 100° C. for 2 hours to allow the isocyanate group to react with the hydroxyl group. Then, 94.5 parts of propylene glycol monomethyl ether acetate was charged, 179.8 parts of a carboxyl group-terminated polyethylene oxide-polypropylene oxide copolymer with a molecular weight of 1,000 was added, and the mixture was maintained at about 90° C. to allow the carbodiimide group to react with the carboxyl group. Thereafter, 94.5 parts of propylene glycol monomethyl ether acetate was added. A compound (b-10) with a number average molecular weight of about 3,700, and a basic nitrogen-containing group amount of 0 mmol was thus obtained.

<c. Preparation of Polyacrylic Side Chain-Containing Carbodiimide-Based Compounds>

PREPARATION EXAMPLE c-1

A four-necked flask equipped with a reflux condenser, nitrogen gas inlet tube, stirring rod and thermometer was charged with 57 parts of an isocyanate group-containing polycarbodiimide compound with a carbodiimide equivalent of 315, and 16 parts of methyl diethanolamine, the mixture was maintained at about 100° C. for 2 hours to allow the isocyanate group to react with the hydroxyl group. Then, 97.7 parts of propylene glycol monomethyl ether acetate was charged, 178.7 parts of a carboxyl group-terminated polymethyl methacrylate with a molecular weight of 1,000 was added, and the mixture was maintained at about 90° C. to allow the carbodiimide group to react with the carboxyl group. Thereafter, 97.7 parts of propylene glycol monomethyl ether acetate was added. A compound (c-1) with a number average molecular weight of about 3,800, and a basic nitrogen-containing group amount of 0.5275 mmol was thus obtained.

PREPARATION EXAMPLE c-2

A compound (c-2) with a number average molecular weight of about 5,500 and a basic nitrogen-containing group amount of 0.3600 mmol was obtained in the same manner as in Preparation Example c-1 except that polymethyl methacrylate with a molecular weight of 1,500 was used in lieu of polymethyl methacrylate with a molecular weight of 1,000.

PREPARATION EXAMPLE c-3

A four-necked flask equipped with a reflux condenser, nitrogen gas inlet tube, stirring rod and thermometer was charged with 52.5 parts of an isocyanate group-containing polycarbodiimide compound with a carbodiimide equivalent of 315, and 14.7 parts of methyl diethanolamine, the mixture was maintained at about 100° C. for 2 hours to allow the isocyanate group to react with the hydroxyl group. Then, 99.5 parts of propylene glycol monomethyl ether acetate was charged, 171.7 parts of a carboxyl group-terminated polymethyl methacrylate with a molecular weight of 1,000 was added, and the mixture was maintained at about 90° C. to allow the carbodiimide group to react with the carboxyl group. Thereafter, 12.4 parts of succinic anhydride was added, the mixture was maintained at about 90° C. to allow the isocyanate group to react with the carboxyl group and then 99.5 parts of propylene glycol monomethyl ether acetate was added. A compound (c-3) with a number average molecular weight of about 4,100, an acid value of 27.6 mgKOH/g, and a basic nitrogen-containing group amount of 0.4919 mmol was thus obtained.

PREPARATION EXAMPLE c-4

A compound (c-4) with a number average molecular weight of about 6,500 and a basic nitrogen-containing group amount of 0.3083 mmol was obtained in the same manner as in Preparation Example c-1 except that polymethyl methacrylate with a molecular weight of 2,000 was used in lieu of polymethyl methacrylate with a molecular weight of 1,000.

PREPARATION EXAMPLE c-5

A compound (c-5) with a number average molecular weight of about 9,100 and a basic nitrogen-containing group amount of 0.2192 mmol was obtained in the same manner as in Preparation Example c-1 except that polymethyl methacrylate with a molecular weight of 3,000 was used in lieu of polymethyl methacrylate with a molecular weight of 1,000.

PREPARATION EXAMPLE c-6

A four-necked flask equipped with a reflux condenser, nitrogen gas inlet tube, stirring rod and thermometer was charged with 57 parts of an isocyanate group-containing polycarbodiimide compound with a carbodiimide equivalent of 315, and 16 parts of methyl diethanolamine, the mixture was maintained at about 100° C. for 2 hours to allow the isocyanate group to react with the hydroxyl group. Then, 97.7 parts of propylene glycol monomethyl ether acetate was charged, 90.5 parts of a carboxyl group-terminated polymethyl methacrylate with a molecular weight of 1,000 was added, and the mixture was maintained at about 90° C. to allow the carbodiimide group to react with the carboxyl group. Thereafter, 106.7 parts of propylene glycol monomethyl ether acetate was added. A compound (c-6) with a number average molecular weight of about 2,400, a carbodiimide equivalent of 1,807, and a basic nitrogen-containing group amount of 0.8216 mmol was thus obtained.

PREPARATION EXAMPLE c-7

A four-necked flask equipped with a reflux condenser, nitrogen gas inlet tube, stirring rod and thermometer was charged with 54 parts of an isocyanate group-containing polycarbodiimide compound with a carbodiimide equivalent of 315, 3.9 parts of methyl diethanolamine, and 59.5 parts of polymethyl methacrylate diol with a molecular weight of 1,000, the mixture was maintained at about 100° C. for 2 hours to allow the isocyanate group to react with the hydroxyl group. Then, 92.4 parts of propylene glycol monomethyl ether acetate was charged, 170.1 parts of a carboxyl group-terminated polymethyl methacrylate with a molecular weight of 2,000 was added, and the mixture was maintained at about 90° C. to allow the carbodiimide group to react with the carboxyl group. Thereafter, 255.2 parts of propylene glycol monomethyl ether acetate was charged. A compound (c-7) with a number average molecular weight of about 8,800, a carbodiimide equivalent of 3,400, and a basic nitrogen-containing group amount of 0.1141 mmol was thus obtained.

PREPARATION EXAMPLE c-8

A four-necked flask equipped with a reflux condenser, nitrogen gas inlet tube, stirring rod and thermometer was charged with 54 parts of an isocyanate group-containing polycarbodiimide compound with a carbodiimide equivalent of 315, 109.4 parts of methyl diethanolamine, and 174.7 parts of isophorone diisocyanate, the mixture was maintained at about 100° C. for 2 hours to allow the isocyanate group to react with the hydroxyl group. Then, 453.7 parts of propylene glycol monomethyl ether acetate was charged, 170.1 parts of a carboxyl group-terminated polymethyl methacrylate with a molecular weight of 2,000 was added, and the mixture was maintained at about 90° C. to allow the carbodiimide group to react with the carboxyl group. Thereafter, 255.2 parts of propylene glycol monomethyl ether acetate was charged. A compound (c-8) with a number average molecular weight of about 15,500, a carbodiimide equivalent of 6,000, and a basic nitrogen-containing group amount of 1.8072 mmol was thus obtained.

PREPARATION EXAMPLE c-9

A four-necked flask equipped with a reflux condenser, nitrogen gas inlet tube, stirring rod and thermometer was charged with 65 parts of an isocyanate group-containing polycarbodiimide compound with a carbodiimide equivalent of 315, 8.2 parts of methyl diethanolamine, and 9.5 parts of 2-pyridine ethanol, the mixture was maintained at about 100° C. for 2 hours to allow the isocyanate group to react with the hydroxyl group. Then, 99.7 parts of propylene glycol monomethyl ether acetate was charged, 209.2 parts of a carboxyl group-terminated polymethyl methacrylate with a molecular weight of 2,000 was added, and the mixture was maintained at about 90° C. to allow the carbodiimide group to react with the carboxyl group. Thereafter, 129.5 parts of propylene glycol monomethyl ether acetate was charged. A compound (c-9) with a number average molecular weight of about 3,786, a carbodiimide equivalent of 2,857, and a basic nitrogen-containing group amount of 0.5275 mmol was thus obtained.

COMPARATIVE PREPARATION EXAMPLE c-10

A four-necked flask equipped with a reflux condenser, nitrogen gas inlet tube, stirring rod and thermometer was charged with 55 parts of an isocyanate group-containing polycarbodiimide compound with a carbodiimide equivalent of 315, and 8.1 parts of ethylene glycol, the mixture was maintained at about 100° C. for 2 hours to allow the isocyanate group to react with the hydroxyl group. Then, 94.5 parts of propylene glycol monomethyl ether acetate was charged, 179.8 parts of a carboxyl group-terminated polymethyl methacrylate with a molecular weight of 1,000 was added, and the mixture was maintained at about 90° C. to allow the carbodiimide group to react with the carboxyl group. Thereafter, 94.5 parts of propylene glycol monomethyl ether acetate was charged. A compound (c-10) with a number average molecular weight of about 3,700 and a basic nitrogen-containing group amount of 0 mmol was thus obtained.

<Pigment: Carbon Black>

[Preparation of Treated Pigment of Example 1 and a Dispersion Composition Comprising the Same]

A 1,000-ml steel can filled with 1,000 g of steel beads (ø 5 mm) was charged with 50 g of carbon black A (average primary particle size 56 nm, pH=3.1) and 450 g of purified water. This mixture was milled for 30 minutes using a paint conditioner to give an aqueous pigment dispersion. This aqueous pigment dispersion was transferred to a four-necked flask equipped with a reflux condenser, nitrogen inlet tube, stirring rod and thermometer, 50 g of the carbodiimide compound (a-1) and 170 g of propylene glycol monomethyl ether acetate were added with stirring, and the reaction was allowed to proceed at about 90° C. for 8 hours. Thereafter, the purified water and propylene glycol monomethyl ether acetate were removed, and the residue was placed in a vacuum drier and dried at 80° C. for 2 hours to give a treated pigment (surface-treated pigment of Example 1; surface-treated pigment 1) as surface-treated with the carbodiimide compound. Further, the formulation materials shown in Table 1 were milled in a bead mill at a temperature of 60° C. for 1 day to give a dispersion composition comprising the surface-treated pigment of Example 1.

[Preparation of Treated Pigment of Example 11 and a Dispersion Composition Comprising the Same]

A 1,000-ml steel can filled with 1,000 g of steel beads (ø 5 mm) was charged with 50 g of carbon black A (average primary particle size 56 nm, pH=3.1) and 450 g of purified water. This mixture was milled for 30 minutes using a paint conditioner to give an aqueous pigment dispersion. This aqueous pigment dispersion was transferred to a four-necked flask equipped with a reflux condenser, nitrogen inlet tube, stirring rod and thermometer, 50 g of the carbodiimide compound (b-1) and 170 g of propylene glycol monomethyl ether acetate were added with stirring, and the reaction was allowed to proceed at about 90° C. for 8 hours. Thereafter, the purified water and propylene glycol monomethyl ether acetate were removed, and the residue was placed in a vacuum drier and dried at 80° C. for 2 hours to give a treated pigment (surface-treated pigment of Example 11; surface-treated pigment 2) as surface-treated with the carbodiimide compound. Further, the formulation materials shown in Table 1 were milled in a bead mill at a temperature of 60° C. for 1 day to give a dispersion composition comprising the surface-treated pigment of Example 11.

[Preparation of Treated Pigment of Example 21 and a Dispersion Composition Comprising the Same]

A 1,000-ml steel can filled with 1,000 g of steel beads (ø 5 mm) was charged with 50 g of carbon black A (average primary particle size 56 nm, pH=3.1) and 450 g of purified water. This mixture was milled for 30 minutes using a paint conditioner to give an aqueous pigment dispersion. This aqueous pigment dispersion was transferred to a four-necked flask equipped with a reflux condenser, nitrogen inlet tube, stirring rod and thermometer, 50 g of the carbodiimide compound (c-1) and 170 g of propylene glycol monomethyl ether acetate were added with stirring, and the reaction was allowed to proceed at about 90° C. for 8 hours. Thereafter, the purified water and propylene glycol monomethyl ether acetate were removed, and the residue was placed in a vacuum drier and dried at 80° C. for 2 hours to give a treated pigment (surface-treated pigment of Example 21; surface-treated pigment 3) as surface-treated with the carbodiimide compound. Further, the formulation materials shown in Table 1 were milled in a bead mill at a temperature of 60° C. for 1 day to give a dispersion composition comprising the surface-treated pigment of Example 21.

[Preparation of Dispersion Compositions of Examples 2 to 10, 12 to 20 and 22 to 30 and of Comparative Examples 1 to 4]

Dispersion compositions comprising the treated carbon black species of Examples 2 to 10, 12 to 20 and 22 to 30 and of Comparative Examples 1 to 4 were prepared each by kneading the materials for each formulation given in Table 1, 2 or 3 in a bead mill for 1 day.

[Preparation of Pigment Dispersion-Based Resist Compositions for Black Matrices of Examples 1 to 30 and Comparative Examples 1 to 4]

Pigment dispersion-based resist compositions for black matrices of Examples 1 to 30 and Comparative Examples 1 to 4 were obtained by uniformly mixing and milling, using a high-speed stirrer, each of the above-mentioned treated carbon black dispersion compositions of Examples 1 to 30 and Comparative Examples 1 to 4 with the other materials for the formulation in question given in Table 4, 5 or 6, followed by filtration through a filter with a pore size of 3 μm.

[Evaluation Tests]

1. Dispersion stability

The treated carbon black dispersion compositions of Examples 1 to 30 and Comparative Examples 1 to 4 and the pigment dispersion-based resist compositions for black matrices of Examples 1 to 30 and Comparative Examples 1 to 4 were each sampled and placed in a glass bottle and, after tight closure, stored at room temperature for 7 days, and the state of the composition was evaluated according to the criteria given below. The evaluation results are shown in Tables 1 to 6.

Evaluation Criteria

A: Neither viscosity increase nor precipitate formation is observed.
B: Such an extent of viscosity increase and/or precipitate formation that can be returned to the original state upon gentle shaking is observed.
C: Such an extent of viscosity increase and/or precipitate formation that cannot be returned to the original state even upon vigorous shaking is observed.

2. Resist Pattern Light-Shielding Property

Those pigment dispersion-based resist compositions for black matrices which had been given the evaluation A or B in the above dispersion stability evaluation were each applied onto a glass substrate to a film thickness of 1 μm using a spin coater. After 3 minutes of prebaking at 100° C., each coat film was exposed to light from a high-pressure mercury lamp and further post-baked at 230° C. for 30 minutes to give an all over coated resist pattern.

The optical density (OD value) of each all over coated resist pattern was measured on a Macbeth densitometer (TD-931, manufactured by GretagMacbeth AG.) to determine the light-shielding property. The evaluation results thus obtained are shown in Tables 4 to 6.

3. Resist Pattern Resistance Value

The surface resistance value of each resist pattern obtained by the above method was measured using a resistance measuring apparatus (R8340/8340A, product name, manufactured by Avantest Corp.). The evaluation results are shown in Tables 4 to 6.

4. Resist Pattern Developability

Those pigment dispersion-based resist compositions for black matrices which had been given the evaluation A or B in the above dispersion stability evaluation were each applied to a glass substrate to a film thickness of 1 μm using a spin coater. Each coat film was prebaked at 100° C. for 3 minutes. The coat film obtained was developed using an aqueous 0.15% solution of $Na_2CO_3$, and the developability thereof was evaluated in terms of the time required for complete removal of the uncured portion of the resist composition according to the criteria given below. The evaluation results are shown in Tables 4 to 6.

A: Complete removal attainable within 30 seconds.
B: Complete removal attainable within a time longer than 30 seconds but not longer than 60 seconds.
C: No complete removal attainable even after 60 seconds.

TABLE 1

| | | | Pigment dispersion composition | | | | | | | | | | | |
|---|---|---|---|---|---|---|---|---|---|---|---|---|---|---|
| | | | Example | | | | | | | | | | Compar. Ex. | |
| | | | 1 | 2 | 3 | 4 | 5 | 6 | 7 | 8 | 9 | 10 | 1 | 2 |
| Carbon black A (part) | | | — | 20 | 20 | 20 | 20 | 20 | 20 | 20 | 20 | 20 | 20 | 20 |
| Surface-treated pigment 1 (part) | | | 24 | — | — | — | — | — | — | — | — | — | — | — |
| Carbodiimide-based compound (part) | <Containing no carbodiimide group> | a-1 | — | 4 | — | — | — | — | — | — | — | — | — | — |
| | | a-2 | — | — | 4 | — | — | — | — | — | — | — | — | — |
| | | a-3 | — | — | — | 4 | — | — | — | — | — | — | — | — |
| | | a-4 | — | — | — | — | 4 | — | — | — | — | — | — | — |
| | | a-5 | — | — | — | — | — | 4 | — | — | — | — | — | — |
| | <Containing carbodiimide group> | a-6 | — | — | — | — | — | — | 4 | — | — | — | — | — |
| | | a-7 | — | — | — | — | — | — | — | 4 | — | — | — | — |
| | | a-8 | — | — | — | — | — | — | — | — | 4 | — | — | — |
| | | a-9 | — | — | — | — | — | — | — | — | — | 4 | — | — |
| | <Basic nitrogen-containing group, containing no carbodiimide group> | a-10 | — | — | — | — | — | — | — | — | — | — | — | 4 |

TABLE 1-continued

|  |  | Pigment dispersion composition |  |  |  |  |  |  |  |  |  | Compar. Ex. |  |
|---|---|---|---|---|---|---|---|---|---|---|---|---|---|
|  |  | Example |  |  |  |  |  |  |  |  |  |  |  |
|  |  | 1 | 2 | 3 | 4 | 5 | 6 | 7 | 8 | 9 | 10 | 1 | 2 |
| Pigment dispersion composition A (solid matter) (part) |  | — | — | — | — | — | — | — | — | — | — | 4 | — |
| Solvent (part) | PGMEA | 76 | 76 | 76 | 76 | 76 | 76 | 76 | 76 | 76 | 76 | 76 | 76 |
| Total |  | 100 | 100 | 100 | 100 | 100 | 100 | 100 | 100 | 100 | 100 | 100 | 100 |
| (Evaluation) | Dispersion stability | A | A | A | A | A | A | A | A | A | A | A | C |

TABLE 2

|  |  |  | Pigment dispersion composition |  |  |  |  |  |  |  |  |  | Compar. Ex. |  |
|---|---|---|---|---|---|---|---|---|---|---|---|---|---|---|
|  |  |  | Example |  |  |  |  |  |  |  |  |  |  |  |
|  |  |  | 11 | 12 | 13 | 14 | 15 | 16 | 17 | 18 | 19 | 20 | 1 | 3 |
| Carbon black A (part) |  |  | — | 20 | 20 | 20 | 20 | 20 | 20 | 20 | 20 | 20 | 20 | 20 |
| Surface-treated pigment 2 (part) |  |  | 24 | — | — | — | — | — | — | — | — | — | — | — |
| Carbodiimide-based compound (part) | <Containing no carbodiimide group> | b-1 | — | 4 | — | — | — | — | — | — | — | — | — | — |
|  |  | b-2 | — | — | 4 | — | — | — | — | — | — | — | — | — |
|  |  | b-3 | — | — | — | 4 | — | — | — | — | — | — | — | — |
|  |  | b-4 | — | — | — | — | 4 | — | — | — | — | — | — | — |
|  |  | b-5 | — | — | — | — | — | 4 | — | — | — | — | — | — |
|  | <Containing carbodiimide group> | b-6 | — | — | — | — | — | — | 4 | — | — | — | — | — |
|  |  | b-7 | — | — | — | — | — | — | — | 4 | — | — | — | — |
|  |  | b-8 | — | — | — | — | — | — | — | — | 4 | — | — | — |
|  |  | b-9 | — | — | — | — | — | — | — | — | — | 4 | — | — |
|  | <Basic nitrogen-containing group, containing no carbodiimide group> | b-10 | — | — | — | — | — | — | — | — | — | — | — | 4 |
| Pigment dispersion composition A (solid matter) (part) |  |  | — | — | — | — | — | — | — | — | — | — | 4 | — |
| Solvent (part) | PGMEA |  | 76 | 76 | 76 | 76 | 76 | 76 | 76 | 76 | 76 | 76 | 76 | 76 |
| Total |  |  | 100 | 100 | 100 | 100 | 100 | 100 | 100 | 100 | 100 | 100 | 100 | 100 |
| (Evaluation) | Dispersion stability |  | A | A | A | A | A | A | A | A | A | A | A | C |

TABLE 3

|  |  |  | Pigment dispersion composition |  |  |  |  |  |  |  |  |  | Compar. Ex. |  |
|---|---|---|---|---|---|---|---|---|---|---|---|---|---|---|
|  |  |  | Example |  |  |  |  |  |  |  |  |  |  |  |
|  |  |  | 21 | 22 | 23 | 24 | 25 | 26 | 27 | 28 | 29 | 30 | 1 | 4 |
| Carbon black A (part) |  |  | — | 20 | 20 | 20 | 20 | 20 | 20 | 20 | 20 | 20 | 20 | 20 |
| Surface-treated pigment 3 (part) |  |  | 24 | — | — | — | — | — | — | — | — | — | — | — |
| Carbodiimide-based compound (part) | <Containing no carbodiimide group> | c-1 | — | 4 | — | — | — | — | — | — | — | — | — | — |
|  |  | c-2 | — | — | 4 | — | — | — | — | — | — | — | — | — |
|  |  | c-3 | — | — | — | 4 | — | — | — | — | — | — | — | — |
|  |  | c-4 | — | — | — | — | 4 | — | — | — | — | — | — | — |
|  |  | c-5 | — | — | — | — | — | 4 | — | — | — | — | — | — |
|  | <Containing carbodiimide group> | c-6 | — | — | — | — | — | — | 4 | — | — | — | — | — |
|  |  | c-7 | — | — | — | — | — | — | — | 4 | — | — | — | — |
|  |  | c-8 | — | — | — | — | — | — | — | — | 4 | — | — | — |
|  |  | c-9 | — | — | — | — | — | — | — | — | — | 4 | — | — |
|  | <Basic nitrogen-containing group, containing no carbodiimide group> | c-10 | — | — | — | — | — | — | — | — | — | — | — | 4 |
| Pigment dispersion composition A (solid matter) (part) |  |  | — | — | — | — | — | — | — | — | — | — | 4 | — |
| Solvent (part) | PGMEA |  | 76 | 76 | 76 | 76 | 76 | 76 | 76 | 76 | 76 | 76 | 76 | 76 |
| Total |  |  | 100 | 100 | 100 | 100 | 100 | 100 | 100 | 100 | 100 | 100 | 100 | 100 |
| (Evaluation) | Dispersion stability |  | A | A | A | A | A | A | A | A | A | A | A | C |

TABLE 4

|  |  | Pigment dispersion-based resist composition Example | | | | | |
|---|---|---|---|---|---|---|---|
|  |  | 1 | 2 | 3 | 4 | 5 | 6 |
| Surface-treated pigment dispersion composition (part) | Example 1 | 40 |  |  |  |  |  |
|  | Example 2 |  | 40 |  |  |  |  |
|  | Example 3 |  |  | 40 |  |  |  |
|  | Example 4 |  |  |  | 40 |  |  |
|  | Example 5 |  |  |  |  | 40 |  |
|  | Example 6 |  |  |  |  |  | 40 |
|  | Example 7 |  |  |  |  |  |  |
|  | Example 8 |  |  |  |  |  |  |
|  | Example 9 |  |  |  |  |  |  |
|  | Example 10 |  |  |  |  |  |  |
|  | Compar. Ex. 1 |  |  |  |  |  |  |
|  | Compar. Ex. 2 |  |  |  |  |  |  |
| BMA/MAA copolymer (part) |  | 5.6 | 5.6 | 5.6 | 5.6 | 5.6 | 5.6 |
| DPEHA (part) |  | 2.4 | 2.4 | 2.4 | 2.4 | 2.4 | 2.4 |
| Irgacure 907 (part) |  | 0.8 | 0.8 | 0.8 | 0.8 | 0.8 | 0.8 |
| PGMEA (part) |  | 51.2 | 51.2 | 51.2 | 51.2 | 51.2 | 51.2 |
| Total |  | 100 | 100 | 100 | 100 | 100 | 100 |
| Evaluation | Dispersion stability | A | A | A | A | A | A |
|  | OD value | 3.9 | 3.9 | 3.8 | 3.9 | 3.8 | 3.8 |
|  | Resistance value | $\geq 1 \times 10^{10}$ | $\geq 1 \times 10^{10}$ | $\geq 1 \times 10^{10}$ | $\geq 1 \times 10^{10}$ | $\geq 1 \times 10^{10}$ | $\geq 1 \times 10^{10}$ |
|  | Developability | A | A | A | A | A | A |

|  |  | Pigment dispersion-based resist composition | | | | | |
|---|---|---|---|---|---|---|---|
|  |  | Example | | | | Compar. Ex. | |
|  |  | 7 | 8 | 9 | 10 | 1 | 2 |
| Surface-treated pigment dispersion composition (part) | Example 1 |  |  |  |  |  |  |
|  | Example 2 |  |  |  |  |  |  |
|  | Example 3 |  |  |  |  |  |  |
|  | Example 4 |  |  |  |  |  |  |
|  | Example 5 |  |  |  |  |  |  |
|  | Example 6 |  |  |  |  |  |  |
|  | Example 7 | 40 |  |  |  |  |  |
|  | Example 8 |  | 40 |  |  |  |  |
|  | Example 9 |  |  | 40 |  |  |  |
|  | Example 10 |  |  |  | 40 |  |  |
|  | Compar. Ex. 1 |  |  |  |  | 40 |  |
|  | Compar. Ex. 2 |  |  |  |  |  | 40 |
| BMA/MAA copolymer (part) |  | 5.6 | 5.6 | 5.6 | 5.6 | 5.6 | 5.6 |
| DPEHA (part) |  | 2.4 | 2.4 | 2.4 | 2.4 | 2.4 | 2.4 |
| Irgacure 907 (part) |  | 0.8 | 0.8 | 0.8 | 0.8 | 0.8 | 0.8 |
| PGMEA (part) |  | 51.2 | 5.12 | 51.2 | 51.2 | 51.2 | 51.2 |
| Total |  | 100 | 100 | 100 | 100 | 100 | 100 |
| Evaluation | Dispersion stability | A | A | A | A | B | C |
|  | OD value | 3.9 | 3.4 | 3.4 | 3.5 | 3.8 | — |
|  | Resistance value | $\geq 1 \times 10^{13}$ | $\geq 1 \times 10^{13}$ | $\geq 1 \times 10^{13}$ | $\geq 1 \times 10^{13}$ | $1 \times 10^{5}$ | — |
|  | Developability | B | B | B | B | C | C |

TABLE 5

|  |  | Pigment dispersion-based resist composition Example | | | | | |
|---|---|---|---|---|---|---|---|
|  |  | 11 | 12 | 13 | 14 | 15 | 16 |
| Surface-treated pigment dispersion composition (part) | Example 11 | 40 |  |  |  |  |  |
|  | Example 12 |  | 40 |  |  |  |  |
|  | Example 13 |  |  | 40 |  |  |  |
|  | Example 14 |  |  |  | 40 |  |  |
|  | Example 15 |  |  |  |  | 40 |  |
|  | Example 16 |  |  |  |  |  | 40 |
|  | Example 17 |  |  |  |  |  |  |
|  | Example 18 |  |  |  |  |  |  |
|  | Example 19 |  |  |  |  |  |  |
|  | Example 20 |  |  |  |  |  |  |

TABLE 5-continued

|  |  | Compar. Ex. 1 | | | | | |
|---|---|---|---|---|---|---|---|
|  |  | Compar. Ex. 3 | | | | | |
| BMA/MAA copolymer (part) | | 5.6 | 5.6 | 5.6 | 5.6 | 5.6 | 5.6 |
| DPEHA (part) | | 2.4 | 2.4 | 2.4 | 2.4 | 2.4 | 2.4 |
| Irgacure 907 (part) | | 0.8 | 0.8 | 0.8 | 0.8 | 0.8 | 0.8 |
| PGMEA (part) | | 51.2 | 51.2 | 51.2 | 51.2 | 51.2 | 51.2 |
| Total | | 100 | 100 | 100 | 100 | 100 | 100 |
| Evaluation | Dispersion stability | A | A | A | A | A | A |
|  | OD value | 3.9 | 3.9 | 3.8 | 3.9 | 3.8 | 3.8 |
|  | Resistance value | $\geq 1 \times 10^{10}$ | $\geq 1 \times 10^{10}$ | $\geq 1 \times 10^{10}$ | $\geq 1 \times 10^{10}$ | $\geq 1 \times 10^{10}$ | $\geq 1 \times 10^{10}$ |
|  | Developability | A | A | A | A | A | A |

| | | Pigment dispersion-based resist composition | | | | | |
|---|---|---|---|---|---|---|---|
| | | Example | | | | Compar.Ex. | |
| | | 17 | 18 | 19 | 20 | 1 | 3 |
| Surface-treated pigment dispersion composition (part) | Example 11 | | | | | | |
| | Example 12 | | | | | | |
| | Example 13 | | | | | | |
| | Example 14 | | | | | | |
| | Example 15 | | | | | | |
| | Example 16 | | | | | | |
| | Example 17 | 40 | | | | | |
| | Example 18 | | 40 | | | | |
| | Example 19 | | | 40 | | | |
| | Example 20 | | | | 40 | | |
| | Compar. Ex. 1 | | | | | 40 | |
| | Compar. Ex. 3 | | | | | | 40 |
| BMA/MAA copolymer (part) | | 5.6 | 5.6 | 5.6 | 5.6 | 5.6 | 5.6 |
| DPEHA (part) | | 2.4 | 2.4 | 2.4 | 2.4 | 2.4 | 2.4 |
| Irgacure 907 (part) | | 0.8 | 0.8 | 0.8 | 0.8 | 0.8 | 0.8 |
| PGMEA (part) | | 51.2 | 51.2 | 51.2 | 51.2 | 51.2 | 51.2 |
| Total | | 100 | 100 | 100 | 100 | 100 | 100 |
| Evaluation | Dispersion stability | A | A | A | A | B | C |
| | OD value | 3.9 | 3.4 | 3.4 | 3.4 | 3.8 | — |
| | Resistance value | $\geq 1 \times 10^{13}$ | $\geq 1 \times 10^{13}$ | $\geq 1 \times 10^{13}$ | $\geq 1 \times 10^{13}$ | $1 \times 10^{5}$ | — |
| | Developability | B | B | B | B | C | C |

TABLE 6

| | | Pigment dispersion-based resist composition | | | | | |
|---|---|---|---|---|---|---|---|
| | | Example | | | | | |
| | | 21 | 22 | 23 | 24 | 25 | 26 |
| Surface-treated pigment dispersion composition (part) | Example 21 | 40 | | | | | |
| | Example 22 | | 40 | | | | |
| | Example 23 | | | 40 | | | |
| | Example 24 | | | | 40 | | |
| | Example 25 | | | | | 40 | |
| | Example 26 | | | | | | 40 |
| | Example 27 | | | | | | |
| | Example 28 | | | | | | |
| | Example 29 | | | | | | |
| | Example 30 | | | | | | |
| | Compar. Ex. 1 | | | | | | |
| | Compar. Ex. 4 | | | | | | |
| BMA/MAA copolymer (part) | | 5.6 | 5.6 | 5.6 | 5.6 | 5.6 | 5.6 |
| DPEHA (part) | | 2.4 | 2.4 | 2.4 | 2.4 | 2.4 | 2.4 |
| Irgacure 907 (part) | | 0.8 | 0.8 | 0.8 | 0.8 | 0.8 | 0.8 |
| PGMEA (part) | | 51.2 | 51.2 | 51.2 | 51.2 | 51.2 | 51.2 |
| Total | | 100 | 100 | 100 | 100 | 100 | 100 |
| Evaluation | Dispersion stability | A | A | A | A | A | A |
| | OD value | 3.9 | 3.9 | 3.8 | 3.9 | 3.8 | 3.8 |
| | Resistance value | $\geq 1 \times 10^{10}$ | $\geq 1 \times 10^{10}$ | $\geq 1 \times 10^{10}$ | $\geq 1 \times 10^{10}$ | $\geq 1 \times 10^{10}$ | $\geq 1 \times 10^{10}$ |
| | Developability | A | A | A | A | A | A |

TABLE 6-continued

|  |  | Pigment dispersion-based resist composition | | | | | |
|---|---|---|---|---|---|---|---|
|  |  | Example | | | | Compar. Ex. | |
|  |  | 27 | 28 | 29 | 30 | 1 | 4 |
| Surface- | Example 21 |  |  |  |  |  |  |
| treated | Example 22 |  |  |  |  |  |  |
| pigment | Example 23 |  |  |  |  |  |  |
| dispersion | Example 24 |  |  |  |  |  |  |
| composition | Example 25 |  |  |  |  |  |  |
| (part) | Example 26 |  |  |  |  |  |  |
|  | Example 27 | 40 |  |  |  |  |  |
|  | Example 28 |  | 40 |  |  |  |  |
|  | Example 29 |  |  | 40 |  |  |  |
|  | Example 30 |  |  |  | 40 |  |  |
|  | Compar. Ex. 1 |  |  |  |  | 40 |  |
|  | Compar. Ex. 4 |  |  |  |  |  | 40 |
| BMA/MAA copolymer (part) |  | 5.6 | 5.6 | 5.6 | 5.6 | 5.6 | 5.6 |
| DPEHA (part) |  | 2.4 | 2.4 | 2.4 | 2.4 | 2.4 | 2.4 |
| Irgacure 907 (part) |  | 0.8 | 0.8 | 0.8 | 0.8 | 0.8 | 0.8 |
| PGMEA (part) |  | 51.2 | 51.2 | 51.2 | 51.2 | 51.2 | 51.2 |
| Total |  | 100 | 100 | 100 | 100 | 100 | 100 |
| Evaluation | Dispersion stability | A | A | A | A | B | C |
|  | OD value | 3.9 | 3.4 | 3.4 | 3.4 | 3.8 | — |
|  | Resistance value | $\geq 1 \times 10^{13}$ | $\geq 1 \times 10^{13}$ | $\geq 1 \times 10^{13}$ | $\geq 1 \times 10^{13}$ | $1 \times 10^{5}$ | — |
|  | Developability | B | B | B | B | C | C |

In Tables 1 to 3, "Pigment dispersant A" stands for PB821 (product name, manufactured by AJINOMOTO Co., Inc.), and "PGMEA" for propylene glycol monomethyl ether acetate. In Tables 4 to 6, "BMA/MAA copolymer" stands for a benzyl methacrylate/methacrylic acid copolymer, "DPEHA" for dipentaerythritol hexaacrylate, and "Irgacure 907" for 2-methyl-1[4-(methylthio)phenyl]-2-morpholino-propane-1-one (product name, manufactured by CIBA SPECIALITY CHEMICALS).

<Pigment: Carbodiimide Group-Reactive Functional Group-Containing Organic Pigment>

[Examples 31 to 46 and Comparative Examples 5 and 6]

Examples 31 to 34 are concerned with treated pigments surface-treated with the carbodiimide compound (a-1) or (a-6), while Examples 35 to 46 are concerned with dispersion compositions of surface-treated pigments dispersed in a dispersion medium while simultaneously surface-treating the same with the respective carbodiimide compounds.

(Preparation of Treated Pigment of Examples 31 and 32 and Dispersion Compositions Comprising the Same)

A 1,000-ml steel can filled with 1,000 g of steel beads (ø 5 mm) was charged with 50 g of plasma-treated C.I. Pigment Red 122 and 450 g of purified water. This mixture was milled for 30 minutes using a paint conditioner to give an aqueous pigment dispersion. This aqueous pigment dispersion was transferred to a four-necked flask equipped with a reflux condenser, nitrogen inlet tube, stirring rod and thermometer, 50 g of the compound (a-1) or the compound (a-6) and 170 g of propylene glycol monomethyl ether acetate were added with stirring, and the reaction was allowed to proceed at about 90° C. for 8 hours. Thereafter, the purified water and propylene glycol monomethyl ether acetate were removed, and the residue was placed in a vacuum drier and dried at 80° C. for 2 hours to give treated pigments (surface-treated pigment of Example 31; surface-treated pigment 4, and surface-treated pigment of Example 32; surface-treated pigment 5) as surface-treated with the carbodiimide compound. Further, the formulation materials shown in Table 7 were kneaded together in a bead mill at a temperature of 60° C. for 1 day to give dispersion compositions comprising the surface-treated pigments of Example 31 and 32.

(Preparation of Treated Pigment of Examples 33 and 34 and Dispersion Compositions Comprising the Same)

A 1,000-ml steel can filled with 1,000 g of steel beads (ø 5 mm) was charged with 50 g of plasma-treated C.I. Pigment Blue 15:3 and 450 g of purified water. This mixture was milled for 30 minutes using a paint conditioner to give an aqueous pigment dispersion. This aqueous pigment dispersion was transferred to a four-necked flask equipped with a reflux condenser, nitrogen inlet tube, stirring rod and thermometer, 50 g of the compound (a-1) or the compound (a-6) and 170 g of propylene glycol monomethyl ether acetate were added with stirring, and the reaction was allowed to proceed at about 90° C. for 8 hours. Thereafter, the purified water and propylene glycol monomethyl ether acetate were removed, and the residue was placed in a vacuum drier and dried at 80° C. for 2 hours to give treated pigments (surface-treated pigment of Example 33; surface-treated pigment 5, and surface-treated pigment of Example 34; surface-treated pigment 6) as surface-treated with the carbodiimide compound. Further, the formulation materials shown in Table 7 were kneaded together in a bead mill at a temperature of 60° C. for 1 day to give dispersion compositions comprising the surface-treated pigments of Example 33 and 34.

(Preparation of Dispersion Compositions of Examples 35 to 46 and Comparative Examples 5 and 6)

Carbodiimide compound surface-treated pigment dispersion compositions of Examples 35 to 46 and pigment dispersion compositions of Comparative Examples 5 and 6 were prepared each by milling the materials for each formulation given in Table 0.7 in a bead mill at a temperature of 60° C. for 1 day.

[Pigment Dispersion-Based Resist Compositions for Color Filters of Examples 31 to 46 and Comparative Examples 5 and 6]

Pigment dispersion-based resist compositions for color filters of Examples 31 to 46 and Comparative Examples 5 and 6 were obtained by uniformly mixing, using a high-speed stirrer, each of the pigment dispersion compositions of Examples 31 to 46 and Comparative Examples 5 and 6 with the other materials for the formulation in question given in Table 8, followed by filtration through a filter with a pore size of 3 μm.

[Evaluation Tests]

1. Dispersion Stability

The treated organic pigment dispersion compositions of Examples 31 to 46 and Comparative Examples 5 and 6 and the pigment dispersion-based resist compositions for color filters of Examples 31 to 46 and Comparative Examples 5 and 6 were each sampled and placed in a glass bottle and, after tight closure, stored at room temperature for 7 days, and the state of the composition was then evaluated according to the criteria given below. The results are shown in Tables 7 and 8.

Evaluation Criteria

A: Neither viscosity increase nor precipitate formation is observed.

B: Such an extent of viscosity increase and/or precipitate formation that can be returned to the original state upon gentle shaking is observed.

C: Such an extent of viscosity increase and/or precipitate formation that cannot be returned to the original state even upon vigorous shaking is observed.

2. Resist pattern developability

Those pigment dispersion-based resist compositions for color filters which had been given the evaluation A or B in the above dispersion stability evaluation were each applied to a glass substrate to a film thickness of 1 μm using a spin coater. Each coat film was prebaked at 100° C. for 3 minutes. The coat film obtained was developed using an aqueous 0.15% solution of $Na_2CO_3$, and the developability thereof was evaluated in terms of the time required for complete removal of the uncured portion of the resist composition according to the criteria given below. The results are shown in Table 8.

A: Complete removal attainable within 30 seconds.

B: Complete removal attainable within a time longer than 30 seconds but not longer than 60 seconds.

C: No complete removal attainable even after 60 seconds.

TABLE 7

| | | | Pigment dispersion composition Example | | | | | | | | |
|---|---|---|---|---|---|---|---|---|---|---|---|
| | | | 31 | 32 | 33 | 34 | 35 | 36 | 37 | 38 | 39 |
| Formulation of pigment dispersion composition (part) | Surface-treated pigment 4 | | 24 | | | | | | | | |
| | Surface-treated pigment 5 | | | 24 | | | | | | | |
| | Surface-treated pigment 6 | | | | 24 | | | | | | |
| | Surface-treated pigment 7 | | | | | 24 | | | | | |
| | C. I. Pigment Red 122 containing an adsorption part with an amino group | | | | | | 20 | 20 | 20 | 20 | 20 |
| | C. I. Pigment Blue 15:3 containing an adsorption part with an amino group | | | | | | | | | | |
| | Carbodiimide compound (solid matter) | a-1 | | | | | 4 | | | | |
| | | a-6 | | | | | | 4 | | | |
| | | b-1 | | | | | | | 4 | | |
| | | b-6 | | | | | | | | 4 | |
| | | c-1 | | | | | | | | | 4 |
| | | c-6 | | | | | | | | | |
| | Pigment dispersion composition A | | | | | | | | | | |
| | PGMEA (part) | | 76 | 76 | 76 | 76 | 76 | 76 | 76 | 76 | 76 |
| Total | | | 100 | 100 | 100 | 100 | 100 | 100 | 100 | 100 | 100 |
| Evaluation | Dispersion stability | | A | A | A | A | A | A | A | A | A |

| | | | Pigment dispersion composition | | | | | | | Compar. Ex. | |
|---|---|---|---|---|---|---|---|---|---|---|---|
| | | | Example | | | | | | | | |
| | | | 40 | 41 | 42 | 43 | 44 | 45 | 46 | 5 | 6 |
| Formulation of pigment dispersion composition (part) | Surface-treated pigment 4 | | | | | | | | | | |
| | Surface-treated pigment 5 | | | | | | | | | | |
| | Surface-treated pigment 6 | | | | | | | | | | |
| | Surface-treated pigment 7 | | | | | | | | | | |
| | C. I. Pigment Red 122 containing an adsorption part with an amino group | | 20 | | | | | | | 20 | |
| | C. I. Pigment Blue 15:3 containing an adsorption part with an amino group | | | 20 | 20 | 20 | 20 | 20 | 20 | | 20 |
| | Carbodiimide | a-1 | 4 | | | | | | | | |

TABLE 7-continued

| | | 1 | 2 | 3 | 4 | 5 | 6 | 7 | 8 | 9 |
|---|---|---|---|---|---|---|---|---|---|---|
| compound (solid matter) | a-6 | | 4 | | | | | | | |
| | b-1 | | | 4 | | | | | | |
| | b-6 | | | | 4 | | | | | |
| | c-1 | | | | | 4 | | | | |
| | c-6 | 4 | | | | | 4 | | | |
| Pigment dispersion composition A | | | | | | | | | 8 | 8 |
| PGMEA (part) | | 76 | 76 | 76 | 76 | 76 | 76 | 76 | 72 | 72 |
| Total | | 100 | 100 | 100 | 100 | 100 | 100 | 100 | 100 | 100 |
| Evaluation | Dispersion stability | A | A | A | A | A | A | A | B | B |

TABLE 8

| | | Pigment dispersion-based resist composition Example | | | | | | | | |
|---|---|---|---|---|---|---|---|---|---|---|
| | | 31 | 32 | 33 | 34 | 35 | 36 | 37 | 38 | 39 |
| Pigment dispersion composition (poart) | Example 31 | 35 | | | | | | | | |
| | Example 32 | | 35 | | | | | | | |
| | Example 33 | | | 35 | | | | | | |
| | Example 34 | | | | 35 | | | | | |
| | Example 35 | | | | | 35 | | | | |
| | Example 36 | | | | | | 35 | | | |
| | Example 37 | | | | | | | 35 | | |
| | Example 38 | | | | | | | | 35 | |
| | Example 39 | | | | | | | | | 35 |
| | Example 40 | | | | | | | | | |
| | Example 41 | | | | | | | | | |
| | Example 42 | | | | | | | | | |
| | Example 43 | | | | | | | | | |
| | Example 44 | | | | | | | | | |
| | Example 45 | | | | | | | | | |
| | Example 46 | | | | | | | | | |
| | Compar. Ex. 5 | | | | | | | | | |
| | Compar. Ex. 6 | | | | | | | | | |
| BMA/MAA copolymer (part) | | 6.9 | 6.9 | 6.9 | 6.9 | 6.9 | 6.9 | 6.9 | 6.9 | 6.9 |
| DPEHA (part) | | 3.0 | 3.0 | 3.0 | 3.0 | 3.0 | 3.0 | 3.0 | 3.0 | 3.0 |
| Irgacure 907 (part) | | 1.0 | 1.0 | 1.0 | 1.0 | 1.0 | 1.0 | 1.0 | 1.0 | 1.0 |
| PGMEA (part) | | 54.1 | 54.1 | 54.1 | 54.1 | 54.1 | 54.1 | 54.1 | 54.1 | 54.1 |
| Total | | 100 | 100 | 100 | 100 | 100 | 100 | 100 | 100 | 100 |
| Evaluation | Dispersion stability | A | A | A | A | A | A | A | A | A |
| | Developability | B | B | B | B | B | B | A | A | B |

| | | Pigment dispersion-based resist composition | | | | | | | | |
|---|---|---|---|---|---|---|---|---|---|---|
| | | Example | | | | | | | Compar. Ex. | |
| | | 40 | 41 | 42 | 43 | 44 | 45 | 46 | 5 | 6 |
| Pigment dispersion composition (poart) | Example 31 | | | | | | | | | |
| | Example 32 | | | | | | | | | |
| | Example 33 | | | | | | | | | |
| | Example 34 | | | | | | | | | |
| | Example 35 | | | | | | | | | |
| | Example 36 | | | | | | | | | |
| | Example 37 | | | | | | | | | |
| | Example 38 | | | | | | | | | |
| | Example 39 | | | | | | | | | |
| | Example 40 | 35 | | | | | | | | |
| | Example 41 | | 35 | | | | | | | |
| | Example 42 | | | 35 | | | | | | |
| | Example 43 | | | | 35 | | | | | |
| | Example 44 | | | | | 35 | | | | |
| | Example 45 | | | | | | 35 | | | |
| | Example 46 | | | | | | | 35 | | |
| | Compar. Ex. 5 | | | | | | | | 35 | |
| | Compar. Ex. 6 | | | | | | | | | 35 |

TABLE 8-continued

| | | | | | | | | | | |
|---|---|---|---|---|---|---|---|---|---|---|
| BMA/MAA copolymer (part) | | 6.9 | 6.9 | 6.9 | 6.9 | 6.9 | 6.9 | 6.9 | 6.9 | 6.9 |
| DPEHA (part) | | 3.0 | 3.0 | 3.0 | 3.0 | 3.0 | 3.0 | 3.0 | 3.0 | 3.0 |
| Irgacure 907 (part) | | 1.0 | 1.0 | 1.0 | 1.0 | 1.0 | 1.0 | 1.0 | 1.0 | 1.0 |
| PGMEA (part) | | 54.1 | 54.1 | 54.1 | 54.1 | 54.1 | 54.1 | 54.1 | 54.1 | 54.1 |
| Total | | 100 | 100 | 100 | 100 | 100 | 100 | 100 | 100 | 100 |
| Evaluation | Dispersion stability | A | A | A | A | A | A | A | C | C |
| | Developability | B | B | B | A | A | B | B | C | C |

In Tables 7 and 8, "Pigment dispersant A" stands for PB821 (product name, manufactured by Ajinomoto Co., Inc.), "PGMEA" for propylene glycol monomethyl ether acetate, "BMA/MAA copolymer" for a benzyl methacrylate/methacrylic acid copolymer, "DPEHA" for dipentaerythritol hexaacrylate, and "Irgacure 907" for 2-methyl-1[4-(methylthio)phenyl]-2-morpholinopropane-1-one (product name, manufactured by CIBA SPECIALITY CHEMICALS).

INDUSTRIAL APPLICABILITY

In accordance with the present invention, treated pigments showing good dispersibility and dispersion stability even at high concentrations when dispersed in dispersion media can be obtained. Furthermore, when pigment dispersion-based resist compositions for color filters are prepared using, as a pigment, organic pigments (high grade organic pigments) having an adsorption part with a basic nitrogen-containing group, and optionally a functional group reactive with a carbodiimide group on the surface thereof, pigment dispersion-based resist compositions for color filters which are excellent in developability, and show high transmissivity and are excellent in contrast can be obtained and, when pigment dispersion-based resist compositions for black matrices are prepared using carbon black as a pigment, pigment dispersion-based resist compositions for black matrices which are excellent in developability, and show high light-shielding and high insulating properties can be obtained.

The invention claimed is:

1. A treated pigment produced by treating at least one pigment with a carbodiimide-based compound, wherein said carbodiimide-based compound comprises
   at least one side chain selected from the group consisting of polyester side chains, polyether side chains and polyacrylic side chains and
   at least one basic nitrogen-containing group.

2. The treated pigment according to claim 1, wherein said carbodiimide-based compound contains 0.02 to 4 mmol of said at least one basic nitrogen-containing group per 1 g of said carbodiimide-based compound.

3. The treated pigment according to claim 1, wherein said pigment has an adsorption part with a basic nitrogen-containing group.

4. The treated pigment according to claim 1, wherein said pigment has a functional group capable of reacting with a carbodiimide group, and said carbodiimide-based compound further contains at least one carbodiimide group.

5. The treated pigment according to claim 4, wherein said pigment having a functional group capable of reacting with a carbodiimide group is an organic pigment or carbon black having a functional group capable of reacting with a carbodiimide group, said functional group capable of reacting with a carbodiimide group has at least one functional group selected from the group consisting of a carboxyl group, a sulfonic acid group, a hydroxyl group and an amino group.

6. The treated pigment according to claim 1, wherein said carbodiimide-based compound comprises a main chain with said at least one side chain branching off said main chain and said main chain has a basic nitrogen-containing group.

7. The treated pigment according to claim 1, wherein said basic nitrogen-containing group is a tertiary amino group or a nitrogen-containing heterocyclic group.

8. A pigment dispersion composition which comprises the treated pigment according to claim 1 and a dispersion medium.

9. A compound for pigment treatment which is a carbodiimide-based compound having at least one side chain selected from the group consisting of polyester chains, polyether chains and polyacrylic chains, and having at least one basic nitrogen-containing group.

10. The compound for pigment treatment according to claim 9, which is a carbodiimide-based compound further comprising at least one carbodiimide group.

* * * * *